(12) United States Patent
Ogawa

(10) Patent No.: US 7,728,886 B2
(45) Date of Patent: Jun. 1, 2010

(54) IMAGE RECORDING APPARATUS AND METHOD

(75) Inventor: Yasuyuki Ogawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 527 days.

(21) Appl. No.: 11/276,131

(22) Filed: Feb. 15, 2006

(65) Prior Publication Data

US 2006/0197848 A1    Sep. 7, 2006

(30) Foreign Application Priority Data

Feb. 18, 2005  (JP) ............................. 2005-043144
Feb. 10, 2006  (JP) ............................. 2006-034318

(51) Int. Cl.
H04N 5/76 (2006.01)

(52) U.S. Cl. ..................... 348/231.6; 382/167; 358/518

(58) Field of Classification Search ............. 348/231.6, 348/231.3, 239; 358/1.9; 345/649
See application file for complete search history.

(56) References Cited

U.S. PATENT DOCUMENTS 6,504,551 B1 * 1/2003 Takashima et al. .......... 345/649
2003/0071897 A1 * 4/2003 Brett ............................ 348/97
2003/0156206 A1   8/2003 Ikeda et al. ............... 348/223.1
2003/0179297 A1 * 9/2003 Parulski et al. ........... 348/207.2
2004/0036898 A1 * 2/2004 Takahashi ................... 358/1.9
2005/0195415 A1 * 9/2005 De Baer ...................... 358/1.9
2008/0174677 A1 * 7/2008 Nakajima et al. ........ 348/231.6

FOREIGN PATENT DOCUMENTS

JP   2003-244723        8/2003
JP   2004-080100 A1     3/2004

* cited by examiner

Primary Examiner—Jason Whipkey
Assistant Examiner—Dennis Hogue
(74) Attorney, Agent, or Firm—Fitzpatrick, Cella, Harper & Scinto

(57) ABSTRACT

An image recording apparatus has a color conversion mode in which it generates color conversion data for color conversion based on an input color which is a source color and an output color which is a destination color. Using the generated color conversion data, the apparatus performs color conversion processing on image data acquired by means of an imaging section. To make the generated color conversion data reproducible, the apparatus outputs the image data obtained through the color conversion processing, associated with color conversion information including, for example, the source color and destination color. The apparatus generates a data file containing, for example, the color conversion information and image data, and records it on a recording medium.

5 Claims, 18 Drawing Sheets

FIG. 11

| R | G1 | R | G1 | R | G1 |
|---|---|---|---|---|---|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

BAYER MATRIX CCD SIGNAL

FIG. 12

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

| G1 | G1 | G1 | G1 | G1 | G1 |
|---|---|---|---|---|---|
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |

| G2 | G2 | G2 | G2 | G2 | G2 |
|---|---|---|---|---|---|
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

BAYER INTERPOLATED SIGNAL

FIG. 13

| | | |
|---|---|---|
| 1/16 | 2/16 | 1/16 |
| 2/16 | 4/16 | 2/16 |
| 1/16 | 2/16 | 1/16 | ns
IMAGE RECORDING APPARATUS AND METHOD

FIELD OF THE INVENTION

The present invention relates to an image recording apparatus and method which pick up and record still images and moving images.

BACKGROUND OF THE INVENTION

Recently, various image processing methods have been proposed to convert image data picked up by image recording apparatus such as digital cameras into final output images. Among others, a method which employs three-dimensional lookup tables has been proposed (see Japanese Patent Laid-Open No. 2004-80100). By using such lookup tables, it is possible to provide an image output apparatus which outputs images after performing desired color conversion of input color.

In this case, the lookup tables can be generated in an imaging device. For example, a lookup table can be created in the imaging device by previewing colors in an image captured by the imaging device and thereby selecting colors before conversion and colors after conversion.

If the lookup tables generated in the imaging device are stored and managed in the imaging device, a user can take photographs by reading out a desired lookup table.

Also, if two or more lookup tables can be managed in the imaging device, it is possible to switch among the lookup tables according to shooting conditions and thereby generate photographic images reflecting the user's needs closely.

However, since lookup tables generated in an imaging device are managed in the imaging device, they cannot be used on other equipment (e.g., a personal computer, another imaging device, etc.). Consequently, when the user processes photographic images by storing them in a personal computer, the user cannot check what lookup tables were generated. Also, when the user plays back photographic images, there is no way for the user to check lookup tables.

SUMMARY OF THE INVENTION

The present invention has been made in view of the above problems and has as an object to make it possible to export color conversion data prepared for image data created by imaging.

According to one aspect of the present invention, there is provided an image recording apparatus comprising: a generating unit configured to generate color conversion data for color conversion based on a source color and destination color; a color conversion unit configured to perform color conversion processing, using the color conversion data, on image data acquired by an imaging unit; and an output unit configured to output the image data obtained by said color conversion unit and color conversion information which makes the color conversion data generated by the generating unit reproducible, while associating the color conversion information with the image data.

Also, according to another aspect of the present invention, there is provided an image recording method comprising: a generating step of generating color conversion data for color conversion based on a source color and destination color; a color conversion step of performing color conversion processing, using the color conversion data, on image data acquired by imaging means; and an output step of outputting the image data obtained in said color conversion step and color conversion information which makes the color conversion data generated by the generating step reproducible, while associating the color conversion information with the image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a conceptual diagram explaining color arrangement of a CCD in the imaging device according to the embodiment of FIG. 1;

FIG. 12 is a conceptual diagram explaining data resulting from interpolation of a CCD signal in the imaging device according to the embodiment of FIG. 1;

Figure 13:
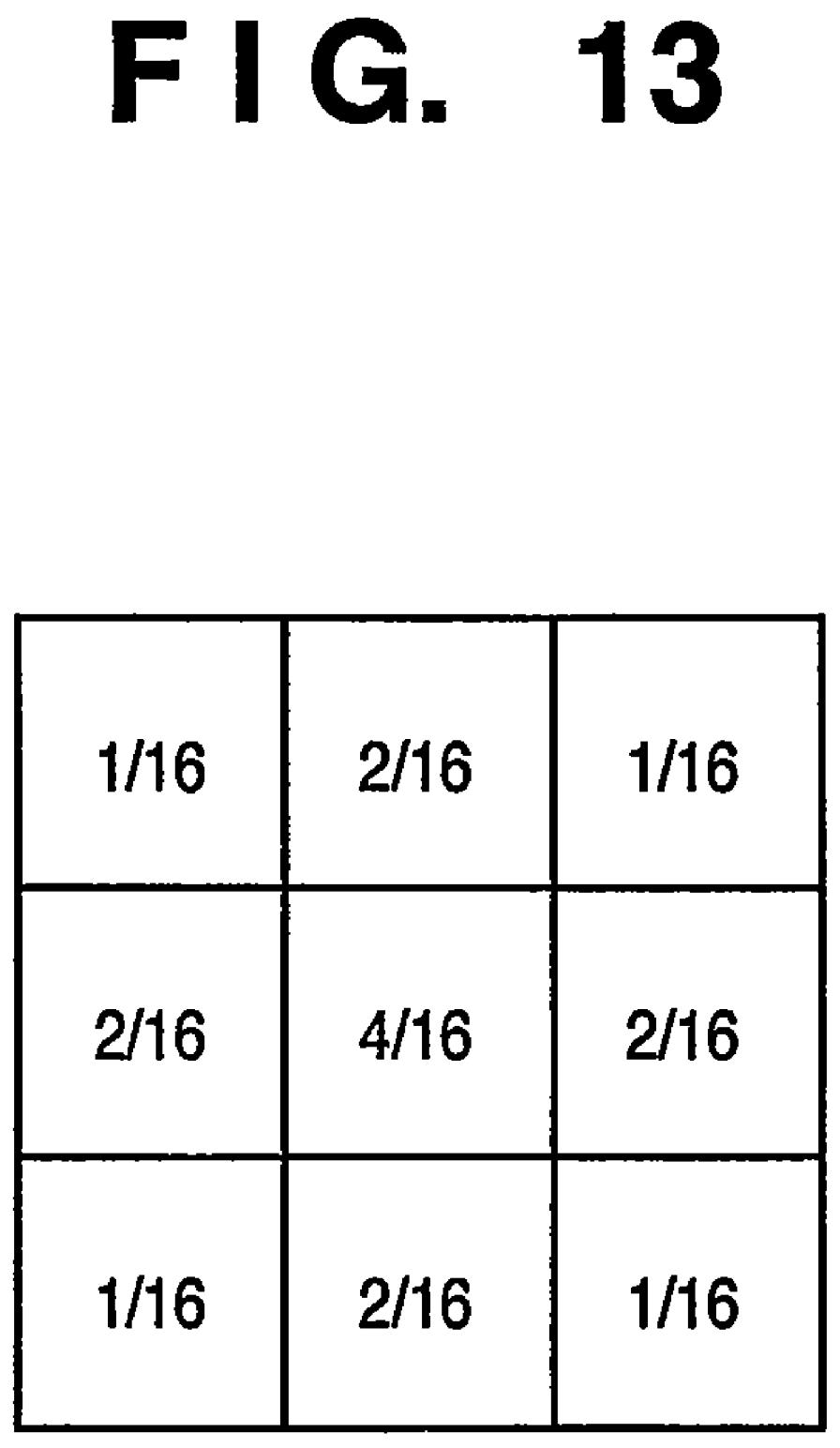

FIG. 13 is a diagram explaining a filter used to create a luminance signal according to the embodiment of FIG. 1;

DETAILED DESCRIPTION OF THE PREFERRED EMBODIMENTS

The preferred embodiments of the present invention will now be described in detail in accordance with the accompanying drawings.

First Embodiment

Figure 1:
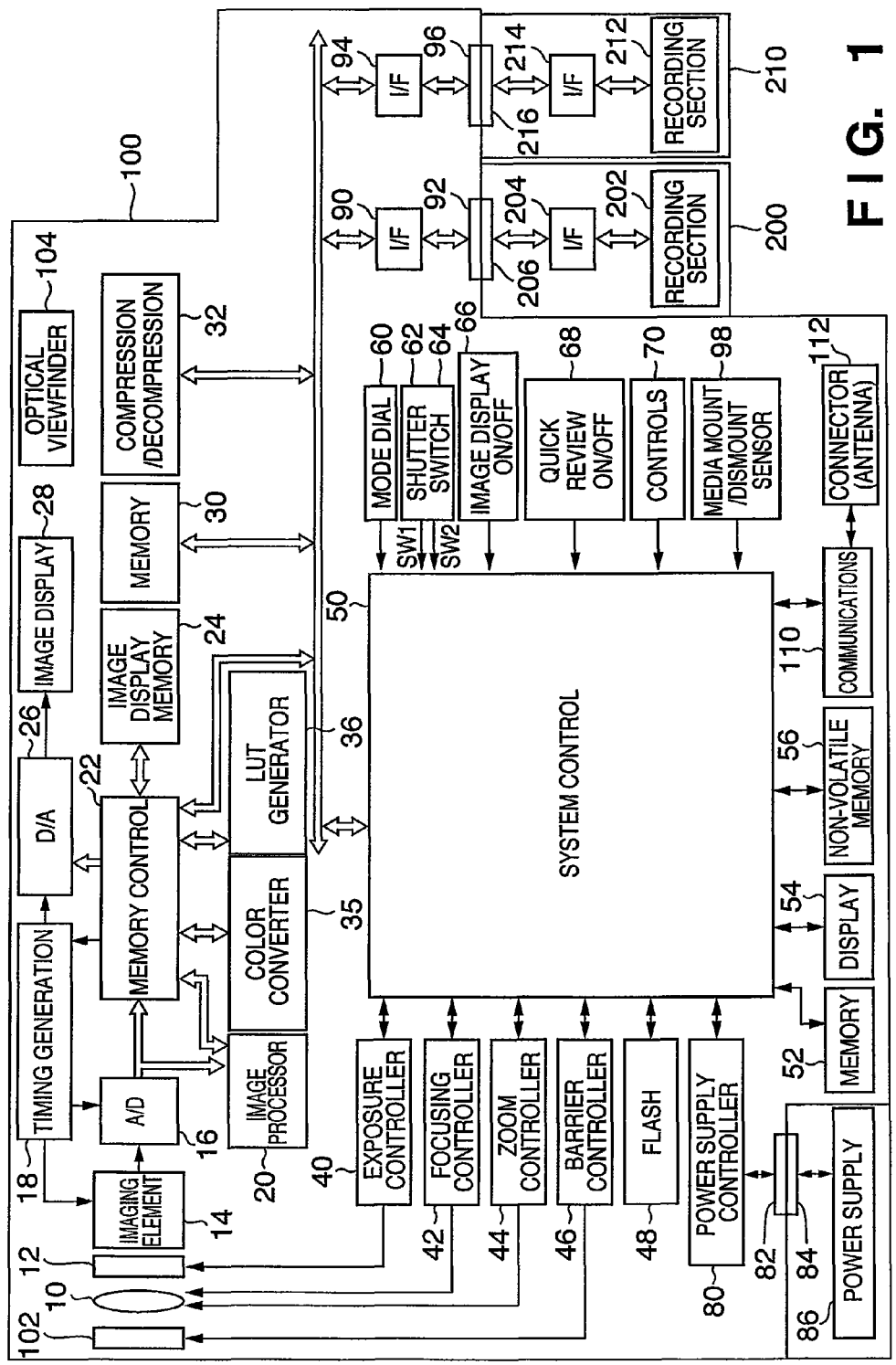
FIG. 1 is a block diagram showing a configuration example of an imaging device according to an embodiment of the present invention.

FIG. 1 is a block diagram showing a configuration example of an imaging device 100 according to this embodiment.

In the imaging device 100, an imaging element 14 converts an optical image reaching its surface via an imaging lens 10 and shutter 12 into an electric signal. The shutter 12 has an aperture adjustment function. An A/D converter 16 converts an analog signal outputted by the imaging element 14 into a digital signal and supplies the digital signal to a memory control circuit 22 and image processing circuit 20. A timing generator circuit 18 supplies clock signals and control signals to the imaging element 14, the A/D converter 16, and a D/A converter 26 and is controlled by the memory control circuit 22 and a system control circuit 50.

The image processing circuit 20 performs predetermined pixel interpolation processing, color conversion processing, and the like on data from the A/D converter 16 and data from the memory control circuit 22. Also, the image processing circuit 20 performs predetermined computations using shot image data created by imaging. Computational results are supplied to the system control circuit 50. Based on the supplied computational results, the system control circuit 50 performs TTL (through-the-lens) AF (auto-focus) processing, AE (auto-exposure) processing, and EF (pre-flash) processing by controlling an exposure controller 40 and focusing controller 42. Furthermore, the image processing circuit 20 performs predetermined computations using shot image data created by imaging, and performs TTL AWB (automatic white balance) processing using computational results.

An LUT generator 36 generates three-dimensional lookup tables for color conversion. A color converter 35 can convert colors of images using the lookup tables generated by the LUT generator 36.

The memory control circuit 22 controls the A/D converter 16, the timing generator circuit 18, the image processing circuit 20, an image display memory 24, the D/A converter 26, a memory 30, and a compression/decompression circuit 32. For example, data from the A/D converter 16 is written into the image display memory 24 or memory 30 via the image processing circuit 20 and memory control circuit 22 or directly via the memory control circuit 22.

An image display 28 consists of a TFT LCD or the like. Image data for display written into the image display memory 24 is displayed on the image display 28 via the D/A converter 26. Incidentally, by displaying image data created by imaging on the image display 28 successively, it is possible to implement an electric viewfinder (EVF). The image display 28 can freely turn the display on and off in response to instructions from the system control circuit 50. By turning off display on the image display 28, it is possible to reduce power consumption of the imaging device 100 greatly.

The memory 30 stores photographed still images and moving images as well as file headers of image files. The memory 30 has enough capacity to store a predetermined number of still images or a predetermined number of minutes of moving images. This makes it possible to write a large number of images into the memory 30 at high speed during continuous shooting or panoramic shooting which involves shooting a number of still images continuously. The memory 30 can also be used as a working area by the system control circuit 50.

The compression/decompression circuit 32 compresses/decompresses image data by an adaptive discrete cosine transform (ADCT) or the like. For example, the compression/decompression circuit 32 reads images out of the memory 30, compresses or decompresses them, and writes the processed data into the memory 30.

The exposure controller 40 controls the shutter 12 equipped with an aperture adjustment function, and performs a flash control function when working in conjunction with a flash 48. The focusing controller 42 controls focusing of the imaging lens 10. A zoom controller 44 controls zooming of the imaging lens 10. A barrier controller 46 controls operation of a protector 102 which serves as a barrier. The flash 48 also has an AF pre-flash function and flash control function. The exposure controller 40 and focusing controller 42 are controlled using a TTL system. That is, the system control circuit 50 controls the exposure controller 40 and focusing controller 42 based on results of computations performed by the image processing circuit 20 on image data created by imaging.

The system control circuit 50 controls the entire imaging device 100. A memory 52 stores constants, variables, programs, etc. for operation of the system control circuit 50. A display 54 presents operating status, messages, and the like using characters, images, voice, etc., according to execution of programs by the system control circuit 50. The display 54 consists of, for example, a liquid crystal display unit, speakers, and the like. Also, the display 54, which is made up of a combination of an LCD, LED, and a sound-producing element, is installed at one or more locations near a control panel of the imaging device 100.

The display 54 has part of its functions provided in an optical viewfinder 104. Information displayed by the display 54 on the LCD and the like include single shot/continuous shot indication, self-timer indication, compression ratio indication, recording pixel count indication, recorded image count indication, remaining shot count indication, shutter speed indication, aperture value indication, exposure correction indication, flash indication, red-eye reduction indication, macro-photography indication, beep setting indication, remaining clock battery capacity indication, remaining battery capacity indication, error indication, information represented by multi-digit numbers, media mount/dismount indication of recording media 200 and 210, communications interface operation indication, and date/time indication. Information displayed by the display 54 in the optical viewfinder 104 includes, for example, in-focus indication, camera shake warning indication, flash charge indication, shutter speed indication, aperture value indication, and exposure correction indication. A non-volatile memory 56, which is an electrically erasable/recordable memory, consists of, for example, a FLASH-ROM.

Reference numerals 60, 62, 64, 66, 68, and 70 denote controls for use to enter various operation commands in the system control circuit 50. The controls are a combination of one or more switches, dials, touch panels, pointing devices employing line-of-sight detection, voice recognition devices, and the like. They will be described concretely below.

A mode dial switch 60 switches among various functional modes, including power-off, automatic shooting mode, shooting mode, panoramic shooting mode, playback mode, multi-screen playback/erase mode, and PC connection mode. A shutter switch 62 (SW1) is turned on when a shutter button (not shown) is pressed halfway. The activation of the shutter switch 62 signals the start of AF (auto-focus) processing, AE (auto-exposure) processing, AWB (auto white balance) processing, and EF (pre-flash) processing. A shutter switch 64 (SW2) is turned on when operation of the shutter button (not shown) is completed. The activation of the shutter switch 64 signals the start of a series of processing, including exposure processing, developing processing, color conversion processing performed by the color converter 35 after the developing processing, and recording processing. Incidentally, the exposure processing consists of writing a signal read from the imaging element 14 into the memory 30 as image data via the A/D converter 16 and memory control circuit 22. The developing processing is performed by reading image data out of the memory 30 using the memory control circuit 22 and using the image processing circuit 20 as required. The recording processing consists of reading image data out of the memory 30, compressing the image data using the compression/decompression circuit 32, and writing the image data into the recording medium 200 or 210.

An image display ON/OFF switch 66 is used to turn on and off the image display 28. This function makes it possible to cut off current supply to the image display 28 consisting of a TFT LCD or the like during shooting by means of the optical viewfinder 104, and thereby achieve power savings. A quick review ON/OFF switch 68 turns on and off a quick review function of automatically playing back image data immediately after shooting. Incidentally, according to this embodiment, in particular, it is assumed that the quick review ON/OFF switch 68 has the function of turning on and off the quick review function when the image display 28 is off. Controls 70 are composed of various buttons, touch panels, etc. Details of the controls 70 will be described later with reference to FIG. 2.

A power supply controller 80 consists of a battery detector circuit, DC/DC converter, switch circuit which switches among blocks to be turned on, etc. The power supply controller circuit 80 detects whether a battery is mounted, the type of battery, and remaining battery power, and supplies necessary voltages to various parts including a recording medium for required periods by controlling the DC/DC converter based on the results of detection as well as on instructions from the system control circuit 50. The power supply controller 80 is connected to a power supply 86 via connectors 82 and 84. The power supply 86 is constituted of a primary battery such as an alkaline battery or lithium battery; secondary battery such as a NiCd battery, NiMH battery, or Li battery; or AC adaptor.

Interfaces 90 and 94, which provide interfaces with the recording media 200 and 210 such as a memory card and hard disk, are connected with the recording media 200 and 210 via connectors 92 and 96. A media mount/dismount sensor 98 senses whether the recording medium 200 or 210 is mounted on the connectors 92 and/or 96. Incidentally, according to this embodiment, it is assumed that two sets of an interface and connector are provided to mount recording media. Of course, either one or multiple sets of an interface and connector for use to mount recording media may be provided. Also, interfaces and connectors of different standards may be used in combination. The interfaces and connectors may be compliant with standards such as PCMCIA card or CF (Compact Flash (registered trademark)) card standards.

The use of interfaces 90 and 94 and connectors 92 and 96 compliant with standards such as PCMCIA card or CF (Compact Flash (registered trademark)) card standards makes it possible to connect various communications cards. By connecting such communications cards, it is possible to exchange image data and management information attached to the image data with other computers and peripheral devices such as printers. Incidentally, communications cards which can be connected include LAN cards, modem cards, USB cards, IEE1394 cards, P1284 cards, SCSI cards, and PHS cards.

The protector 102 provides a barrier to cover an imaging section of the imaging device 100 including the imaging lens 10, thereby protecting the imaging section from contamination and breakage. The imaging device 100 is equipped with the optical viewfinder 104. This makes it possible to take photographs using the optical viewfinder 104 alone without using the electric viewfinder function of the image display 28.

Part of the functions of the display 54 is provided in the optical viewfinder 104, including in-focus indication, camera shake warning indication, flash charge indication, shutter speed indication, aperture value indication, and exposure correction indication functions.

A communications section 110 has RS232C, USB, IEEE1394, P1284, SCSI, modem, LAN, and other communications functions. A connector 112 is used by the communications section 110 to connect the imaging device 100 with other devices. In the case of wireless communications, an antenna is used instead of the connector 112.

The recording medium 200 is a memory card or hard disk. The recording medium 200 has a recording section 202 which consists of a semiconductor memory, magnetic disk, or the like; interface 204 with the imaging device 100; and connector 206 for connection with the imaging device 100. Similarly, the recording medium 210 has a recording section 212 which consists of a semiconductor memory, magnetic disk, or the like; interface with the 214 the imaging device 100; and connector 216 for connection with the imaging device 100.

Figure 2:
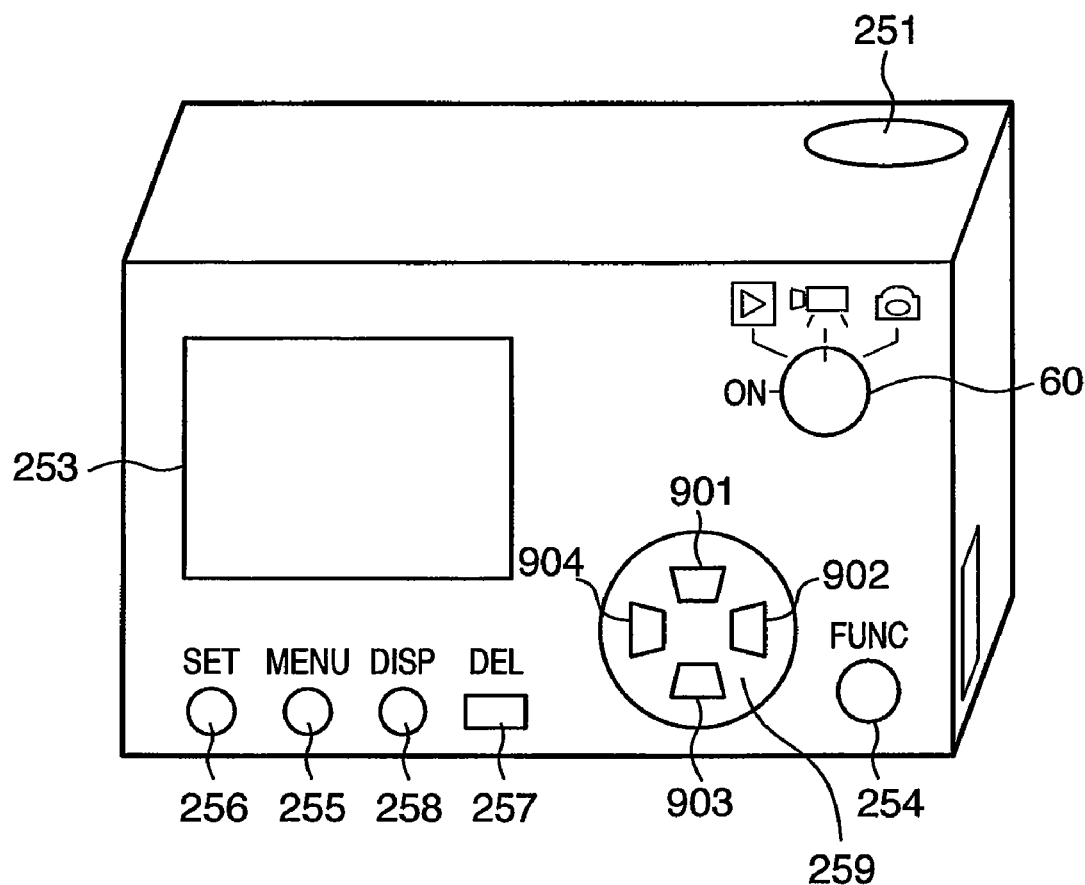
FIG. 2 is a diagram showing external appearance of the imaging device according to the embodiment of FIG. 1.

FIG. 2 is a perspective view of the imaging device 100 (digital camera, according to this embodiment). A shutter button 251 functions as the shutter switches 62 and 64 described above. The mode dial switch 60 switches among various functional modes, including power-off, automatic shooting mode, shooting mode (moving-image shooting mode, still-image shooting mode), panoramic shooting mode, playback mode, multi-screen playback/erase mode, and PC connection mode. An LCD display 253, which constitutes part of the image display 28, functions as an electric viewfinder and displays screens obtained by playing back still images and/or moving images.

In FIG. 2, reference numerals 254 to 259 denote examples of the controls 70 described above. A MENU button 255 turns on and off a menu screen used to change shooting parameters and camera settings. When the MENU button 255 is pressed, a menu screen appears on the image display 28 (LCD display 253), allowing the user to make various settings. A SET button 256 is used to select and decide on menu items on the menu screen displayed by means of the MENU button 255. A DELETE button 257 is used to delete images. A DISPLAY button 258, which constitutes the image display ON/OFF switch 66, is used to switch on and off the LCD display 253. A cross-key pad 259 is a switch consisting of an UP button 901, RIGHT button 902, DOWN button 903, and LEFT button 904 arranged crosswise. The UP, DOWN, LEFT and RIGHT buttons of the cross-key pad 259 allows the user to move items on the menu screen, and so on. The LEFT and RIGHT buttons (902 and 904) are also used to advance images in playback mode. When a FUNC 254 button is pressed, a FUNC menu screen appears on the image display 28, allowing the user to make settings for shooting. The user can intuitively make various settings using the menu screen displayed on the image display 28 and the group of control buttons.

Next, color conversion processing according to this embodiment will be described with reference to FIGS. 10 to 14. As described above, the color converter 35 performs color conversion processing using lookup tables (three-dimensional lookup tables) generated by the LUT generator 36.

Figure 10:
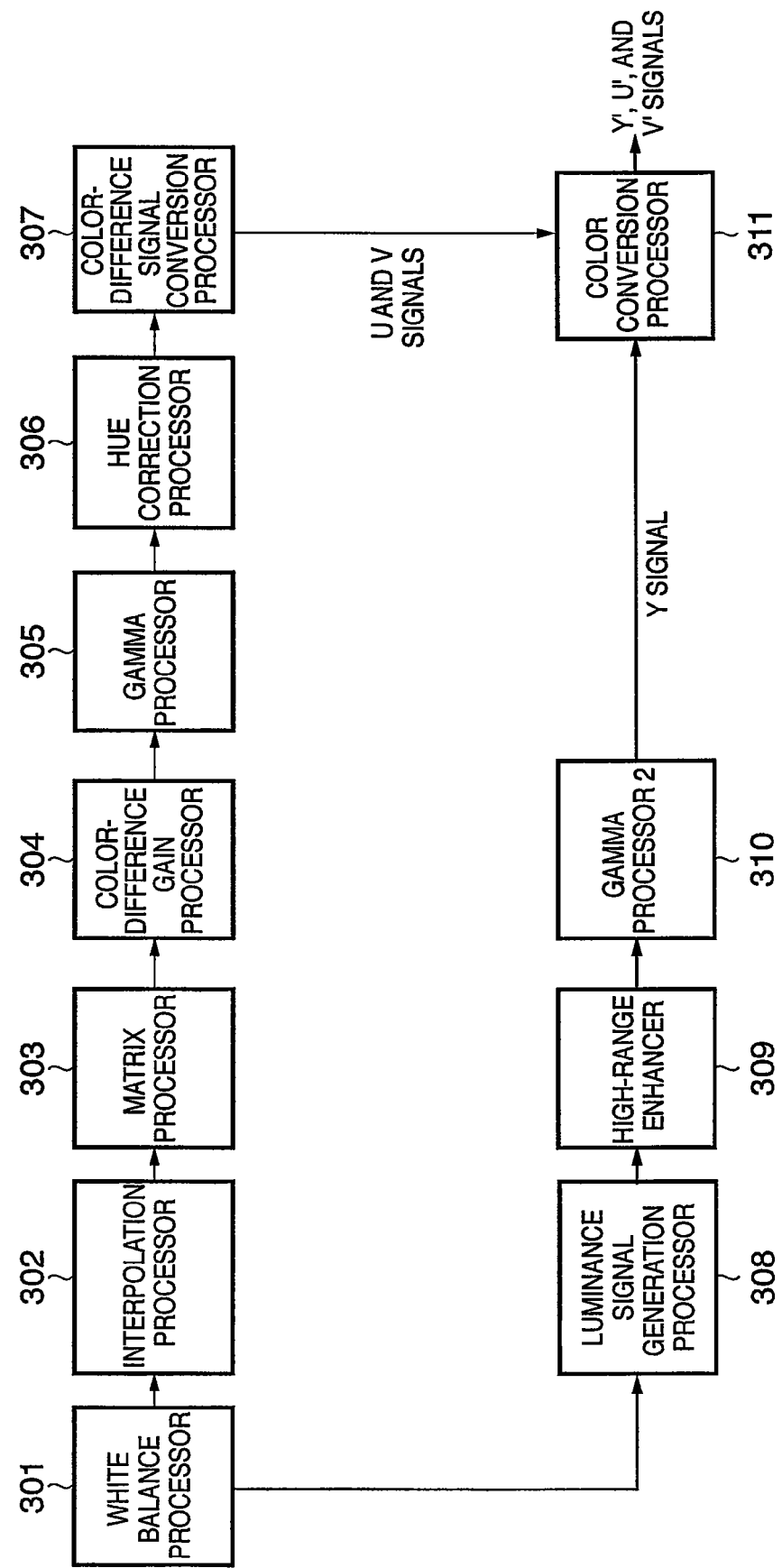
FIG. 10 is a block diagram showing a functional configuration of an image processing circuit and color converter according to the embodiment of FIG. 1.

FIG. 10 is a block diagram explaining a functional configuration of the image processing circuit 20 and color converter 35 in the imaging device 100 according to this embodiment. Incidentally, parameter values (parameters for matrix operations or parameters of lookup tables) used below for various processing are stored in the memory 52 or 30 and read out by the image processing circuit 20 and color converter 35 as required. Also, the lookup table described below is generated by the LUT generator 36. In FIG. 10, reference numerals 301 to 310 denote functions implemented by the image processing circuit 20 and reference numeral 311 denotes a function implemented by the color converter 35.

After undergoing A/D conversion performed by the A/D converter 16, a CCD digital signal is subjected to white balance processing by a white balance processor 301. Although the white balance processing is not described herein, it can be performed using a method described in Japanese Patent Laid-Open No. 2003-244723. After undergoing the white balance processing, the CCD digital signal is supplied to an interpolation processor 302. The imaging element 14 according to this embodiment has a Bayer color filter array such as shown in FIG. 11. Thus, the interpolation processor 302 converts the CCD Bayer array data shown in FIG. 11 into interpolated R, G1, G2, and B data shown in FIG. 12. The interpolated CCD digital signal is inputted into a matrix processor 303 and subjected to a 4×3 matrix operation given by Eq. (1) to determine Rm, Gm, and Bm:

$$\begin{vmatrix} Rm \\ Gm \\ Bm \end{vmatrix} = \begin{vmatrix} M11 & M21 & M31 & M41 \\ M12 & M22 & M32 & M42 \\ M13 & M23 & M33 & M43 \end{vmatrix} \begin{vmatrix} R \\ G1 \\ G2 \\ B \end{vmatrix} \quad \text{Eq. (1)}$$

After the CCD digital signal undergoes the matrix processing, gains are given to its color-difference signals by a color-difference gain processor 304. That is, the Rm, Gm, and Bm signals are converted into Y, Cr, Cb signals using Eq. (2). Gains are given to the resulting Y, Cr, Cb signals using Eq. (3). Subsequently, the Y, Cr, Cb signals are converted into Rg, Gg, and Bg signals using Eq. (4) (inverse matrix operation of Eq. (2)):

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rm \\ Gm \\ Bm \end{vmatrix} \quad \text{Eq. (2)}$$

$$Cr' = G1 \times Cr \quad \text{Eq. (3)}$$
$$Cb' = G1 \times Cb$$

$$\begin{vmatrix} Rg \\ Gg \\ Bg \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad \text{Eq. (4)}$$

After undergoing the color-difference processing, the CCD digital signal is sent to a gamma processor 305, which performs gamma conversion of the CCD digital signal using Eqs. (5) to (7) below. GammaTable is a one-dimensional lookup table.

$$Rt = \text{GammaTable}[Rg] \quad \text{Eq. (5)}$$

$$Gt = \text{GammaTable}[Gg] \quad \text{Eq. (6)}$$

$$Bt = \text{GammaTable}[Bg] \quad \text{Eq. (7)}$$

The CCD digital signal subjected to the gamma processing is sent to a hue correction processor 306, which converts Rt, Gt, and Bt signals into Y, Cr, Cb signals using Eq. (8), corrects the Cr and Cb signals using Eq. (9), and converts the Y, Cr, Cb signals into Rh, Gh, and Bh signals using Eq. (10) (inverse matrix operation of Eq. (9)):

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rt \\ Gt \\ Bt \end{vmatrix} \quad \text{Eq. (8)}$$

$$\begin{vmatrix} Cr' \\ Cb' \end{vmatrix} = \begin{vmatrix} H11 & H21 \\ H12 & H22 \end{vmatrix} \begin{vmatrix} Cr \\ Cb \end{vmatrix} \quad \text{Eq. (9)}$$

$$\begin{vmatrix} Rh \\ Gh \\ Bh \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad \text{Eq. (10)}$$

The CCD digital signal processed by hue correction processor 306 is sent to a color-difference signal conversion processor 307, which creates a UV signal from the Rh, Gh, and Bh signals using Eq. (11).

$$\begin{vmatrix} U \\ V \end{vmatrix} = \begin{vmatrix} -0.169 & -0.333 & 0.502 \\ 0.499 & -0.421 & -0.078 \end{vmatrix} \begin{vmatrix} Rh \\ Gh \\ Bh \end{vmatrix} \quad \text{Eq. (11)}$$

After undergoing the white balance processing performed by a white balance processor 301, the CCD digital signal is also sent to a luminance signal generation processor 308, which converts the CCD digital signal into a luminance signal. For example, in case of primary color filters such as shown in FIG. 11, a luminance signal is obtained by setting all R and B signal components to be zero, and applying two-dimensional filtering with coefficients shown in FIG. 13. On the other hand, in case of complementary color filters, a luminance signal is obtained by directly applying the two-dimensional filtering with the coefficients shown in FIG. 13. The luminance signal generated by the luminance signal generation processor 308 is subjected to edge enhancement by a high-frequency enhancer 309 and subjected to gamma conversion processing by a gamma processor 310 to produce a Y signal.

The Y signal outputted from the gamma processor 310 and the U and V signals outputted from the color-difference signal conversion processor 307 are converted into Y', U', and V' signals by a color conversion processor 311. The color conversion processor 311 performs conversion using a three-dimensional lookup table as color conversion data, and detailed description thereof will be provided later.

The digital camera according to this embodiment (imaging device 100) has a shooting mode (hereinafter referred to as color conversion mode) which can convert any color specified by the user into any other color specified by the user. In the color conversion mode, an electric viewfinder (EVF) screen 802 such as shown in FIG. 8C appears on the LCD 253. By making a predetermined operation while a desired color in a captured image which is displayed in real time, falls within a color capture frame 803, the image color in the color capture frame 803 is determined as a source color or destination color. Once the source color and destination color are determined, the LUT generator 36 sets a lookup table for the color conversion processor 311 so that the source color will be converted into the destination color. The color conversion mode according to this embodiment will be described in detail below.

Figure 14:
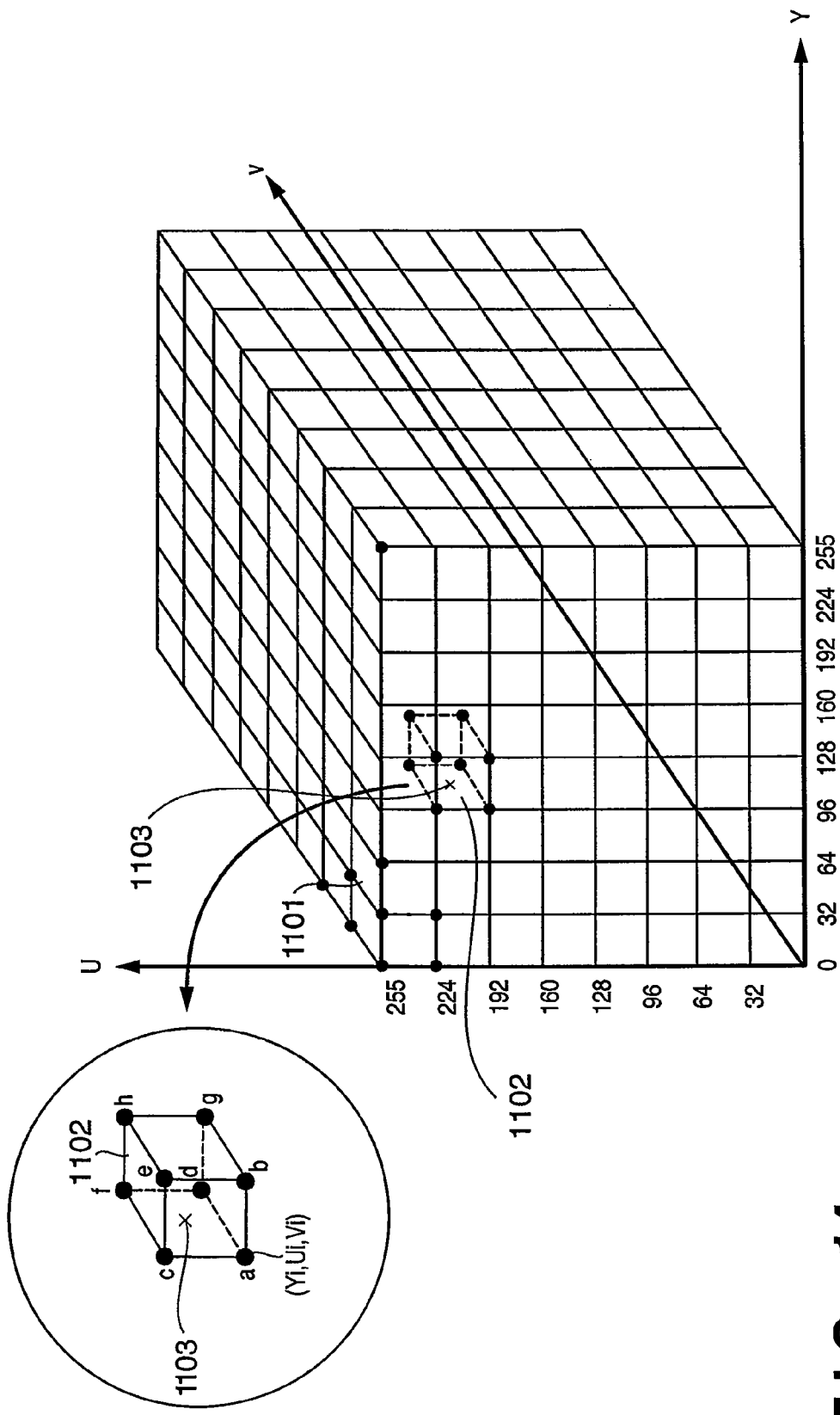
FIG. 14 is a diagram explaining color conversion processing by means of a three-dimensional lookup table of FIG. 1.

First, description will be given of color conversion processing from a source color to a destination color in color conversion mode. The color conversion processor 311 converts YUV into Y'U'V' using a three-dimensional lookup table. According to this embodiment, to reduce memory requirements of the lookup table, the interval between minimum and maximum values of each of the Y, U, and V signals are divided into eight parts to prepare a YUV value list (lookup table) made up of 729 (=9×9×9) three-dimensional representative lattice points. Incidentally, parts of the YUV signals other than the representative lattice points are determined by interpolation. FIG. 14 is a diagram conceptually showing a three-dimensional lookup table according to this embodiment. Each lattice point contains converted YUV values. For example, a lattice point 1101 contains (32, 255, 32). If there is no change before and after the conversion, the values (32, 255, 32) are assigned to the point 1101. If the values of the lattice point 1101 is converted into (32, 230, 28), they are assigned to the lattice point 1101.

For example, the YUV values of a point 1103 within a cubic lattice 1102 in FIG. 14 are interpolated from the YUV values of lattice points a to h corresponding to the vertices of the cubic lattice 1102. Interpolation computations are performed using Eqs. (12) to (14) below. In Eqs. (12) to (14), input YUV signals are denoted by Y, U, and V while output YUV signals are denoted by Yout(Y,U,V), Uout(Y,U,V), and Vout(Y,U,V). Signals at the representative lattice point (point a in FIG. 14) smaller than and closest to signal values of Y, U, and V in the input YUV signals are denoted by Yi, Ui, and Vi. Output signals at the representative lattice point are denoted by Yout (Yi,Ui,Vi), Uout(Yi,Ui,Vi), and Vout(Yi,Ui,Vi). Step width (32, according to this embodiment) of representative lattice points is denoted by Step. Thus, signals at lattice point b are denoted by Yi+step, Ui, Vi while signals at lattice point c are denoted by Yi, Ui+step, Vi.

$$Y=Yi+Yf$$

$$U=Ui+Uf$$

$$V=Vi+Vf$$

$$Yout(Y,U,V)=Yout(Yi+YtUi+Uf,Vi+Ve=(Yout(Yi,Ui,Vi)\times(Step\text{-}Yf)\times(Step\text{-}Uf)\times(Step\text{-}Vf)+Yout(Yi+Step,Ui,Vi)\times(Yf)\times(Step\text{-}Uf)\times(Step\text{-}Vf)+Yout(Yi,Ui+Step,Vi)\times(Step\text{-}Yf)\times(Uf)\times(Step\text{-}Vf)+Yout(Yi,Ui,Vi+Step)\times(Step\text{-}Yf)\times(Step\text{-}Uf)\times(Vf)+Yout(Yi+Step,Ui+Step,Vi)\times(Yf)\times(Uf)\times(Step\text{-}Vf)+Yout(Yi+Step,Ui,Vi+Step)\times(Yf)\times(Step\text{-}Uf)\times(Vf)+Yout(Yi+Step,Vi+Step)\times(Step\text{-}Yf)\times(Uf)\times(Vf)+Yout(Yi+Step,Ui+Step,Vi+Step)\times(Yf)\times(Uf)\times(Vf))/(Step\times Step\times Step)$$
Eq. (12)

$$Uout(Y,U,V)=Uout(Yi+Yf,Ui+Uf,Vi+Vf)=(Uout(Yi,Ui,Vi)\times(Step\text{-}Yf)\times(Step\text{-}Uf)\times(Step\text{-}Vf)+Uout(Yi+Step,Ui,Vi)\times(Yf)\times(Step\text{-}Uf)\times(Step\text{-}Vf)+Uout(Yi,Ui+Step,Vi)\times(Step\text{-}Yf)\times(Uf)\times(Step\text{-}Vf)+Uout(Yi,Ui,Vi+Step)\times(Step\text{-}Yf)\times(Step\text{-}Uf)\times(Vf)+Uout(Yi+Step,Ui+Step,Vi)\times(Yf)\times(Uf)\times(Step\text{-}Vf)+Uout(Yi+Step,Ui,Vi+Step)\times(Yf)\times(Step\text{-}Uf)\times(Vf)+Uout(Yi,Ui+Step,Vi+Step)\times(Step\text{-}Yf)\times(Uf)\times(Vf)+Uout(Yi+Step,Ui+Step,Vi+Step)\times(Yf)\times(Uf)\times(Vf))/(Step\times Step\times Step)$$
Eq. (13)

$$Vout(Y,U,V)=Vout(Yi+Yf,Ui+Uf,Vi+Vf)=(Vout(Yi,Ui,Vi)\times(Step\text{-}Yf)\times(Step\text{-}Uf)\times(Step\text{-}Vf)+Vout(Yi+Step,Ui,Vi)\times(Yf)\times(Step\text{-}Uf)\times(Step\text{-}Vf)+Vout(Yi,Ui+Step,Vi)\times(Step\text{-}Yf)\times(Uf)\times(Step\text{-}Vf)+Vout(Yi,Ui,Vi+Step)\times(Step\text{-}Yf)\times(Step\text{-}Uf)\times(Vf)+Vout(Yi+Step,Ui+Step,Vi)\times(Yf)\times(Uf)\times(Step\text{-}Vf)+Vout(Yi+Step,Ui,Vi+Step)\times(Yf)\times(Step\text{-}Uf)\times(Vf)+Vout(Yi,Ui+Step,Vi+Step)\times(Step\text{-}Yf)\times(Uf)\times(Vf)+Vout(Yi+Step,Ui+Step,Vi+Step)\times(Yf)\times(Uf)\times(Vf))/(Step\times Step\times Step)$$
Eq. (14)

The lookup table conversion and interpolation formulae given by Eqs. (12) to (14) above will be represented in a simplified manner by Eq. (15) below, where Y, U, and V denote input signal values, LUT denote a 9×9×9 lookup table such as shown in FIG. 14, and Yout, Uout, and Vout denote results of conversion and interpolation of the lookup table (Y', U', and V' in FIG. 10). That is, the color conversion processor 311 performs conversion processing represented by Eq. (15) below:

$$(Yout,Uout,Vout)=LUT[(Y,U,V)]$$
Eq. (15)

As described above, when a source color and destination color are determined in color conversion mode, a cubic lattice which connotes the source color is determined, and the values of the lattice points composing the cubic lattice are changed so that coordinate positions of the source color will correspond to those of the destination color. For example, if the source color in FIG. 14 is represented by the YUV values at the point 1103, the values of the lattice points a to h of the cubic lattice 1102 are changed so that the YUV values at the point 1103 will correspond to the YUV values of the destination color when the interpolation processing given by Eq. (15) is performed. The values of the representative lattice points after the change can be determined mathematically although detailed description will be omitted. Subsequently, the color conversion processor 311 performs color conversion processing using the changed three-dimensional lookup table.

Since color conversion is performed by determining lattice point data of a three-dimensional lookup table based on a specified source color and destination color as described above, the user can make desired color settings for an image to be played back. The color conversion processing described above changes only representative lattice points near a color desired to be changed in the three-dimensional lookup table. This makes it possible to convert only part of colors rather than all colors in the image into desired colors easily and quickly. That is, since parameters used by the matrix processor 303, color-difference gain processor 304, gamma processor 305, hue correction processor 306, and the like are not changed, it is possible to change only desired colors (color areas).

Next, operation of the imaging device 100 according to the first embodiment, especially operation related to the color conversion mode, will be described with reference to FIGS. 3 to 9.

Figure 3:
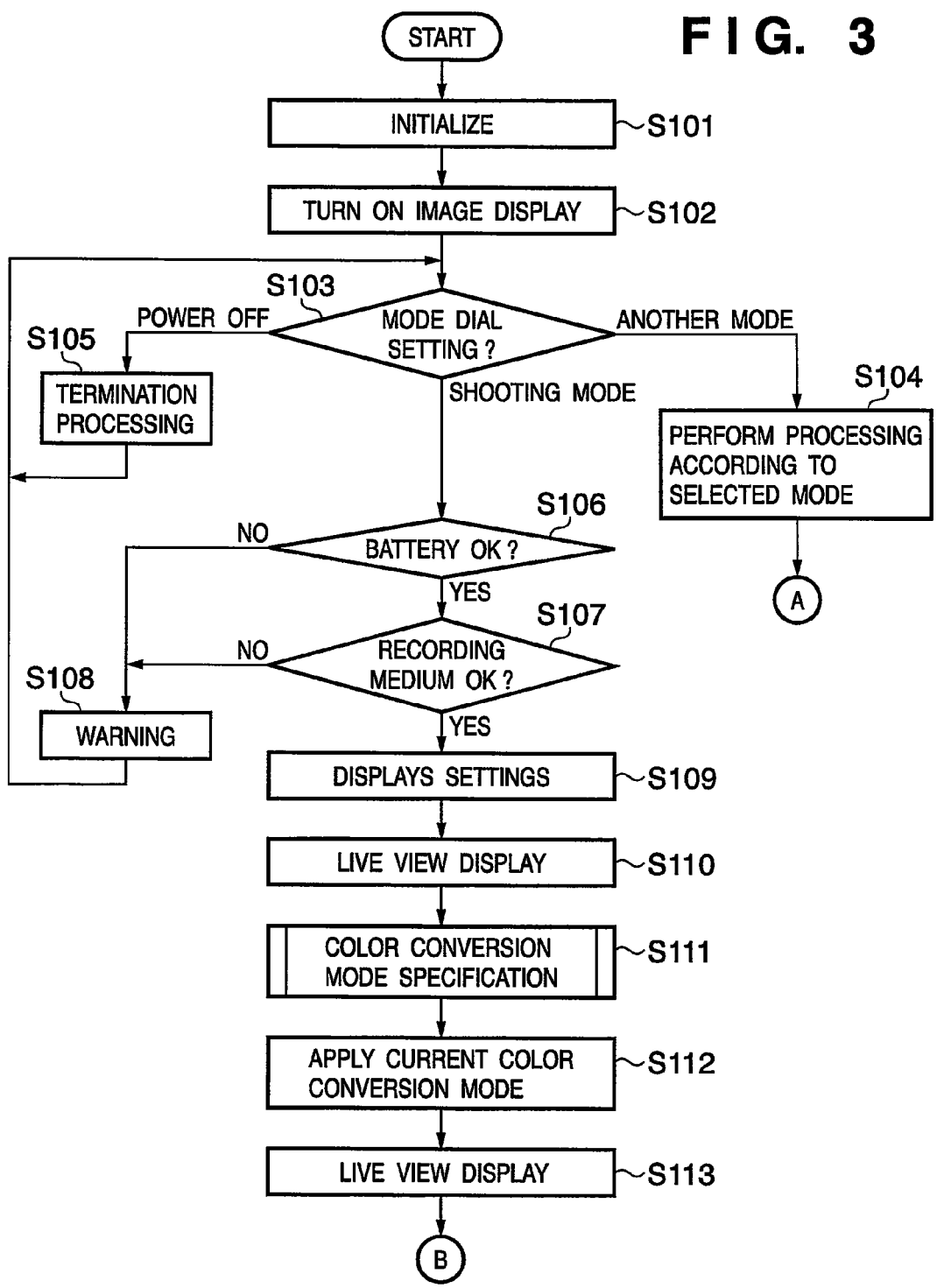
FIG. 3 is a flowchart showing a main routine according to the embodiment of FIG. 1.
Figure 4:
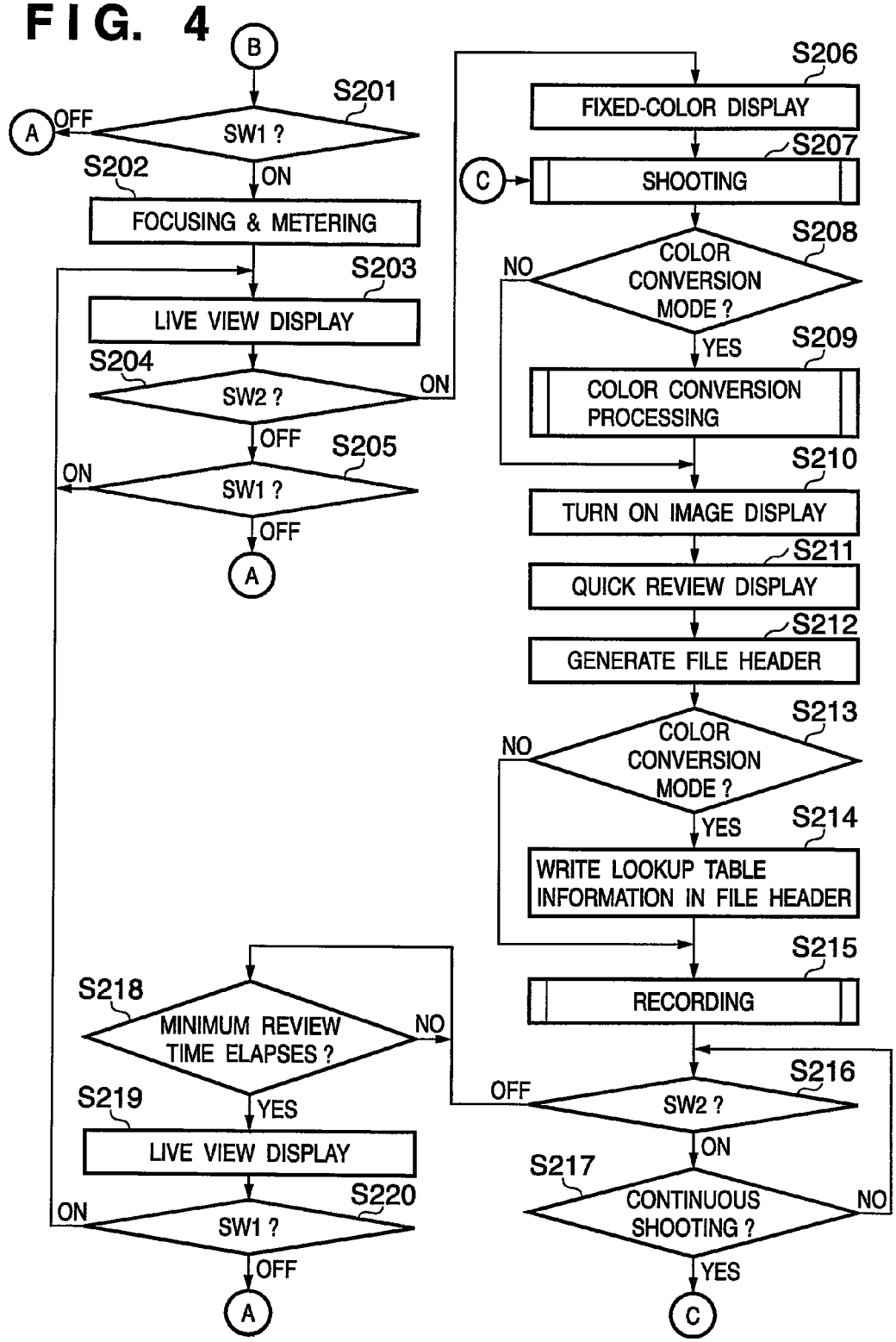
FIG. 4 is a flowchart showing the main routine according to the embodiment of FIG. 1.

FIGS. 3 and 4 are flowcharts showing a main routine of the imaging device 100 according to this embodiment. The operation of the imaging device 100 will be described with reference to FIGS. 3 and 4.

Upon power-up such as after a battery replacement, the system control circuit 50 initializes flags and control variables in Step S101. In Step S102, the system control circuit 50 turns on the image display 28 by default. In Step S103, the system control circuit 50 checks the setting position of the mode dial 60. If the mode dial 60 is set to Power OFF, the system control circuit 50 goes from Step S103 to Step S105 and performs termination processing. In the termination processing, the system control circuit 50 deactivates displays and closes the barrier of the protector 102 to protect the imaging section. Subsequently, the system control circuit 50 records parameters and settings (flags and control variables) to be stored as well as current modes in the non-volatile memory 56. Next, the system control circuit 50 makes the power supply controller 80 cut off unnecessary power to various parts of the imaging device 100 including the image display 28. After the termination processing, the system control circuit 50 returns to Step S103.

If it is found in Step S103 that the mode dial 60 is set to a mode other than power-off and shooting modes, the system control circuit 50 goes to Step S104, where it performs processing according to the selected mode, and returns to Step S103 after the processing.

If it is found in Step S103 that the mode dial 60 is set to Shooting mode, the system control circuit 50 goes to Step S106, where it makes the power supply controller 80 determine whether remaining capacity or operating state of the power supply 86 consisting of a battery or the like presents a problem for the operation of the imaging device 100. If there is a problem, the system control circuit 50 goes to Step S108, where it displays a predetermined warning on the display 54 using images, voice, and the like. After that, it returns to Step S103.

If there is no problem with the power supply 86, the system control circuit 50 goes from Step S106 to Step S107, where it determines whether the recording medium 200 or 210 presents a problem for the operation of the imaging device 100, for example, whether the recording medium 200 or 210 has a problem with recording or playback of image data. If it is determined that there is a problem, the system control circuit 50 goes to Step S108, where it displays a predetermined warning on the display 54 using images, voice, and the like. After that, it returns to Step S103.

If there is no problem with the recording medium 200 or 210, the system control circuit 50 goes from Step S107 to Step S109, where it displays settings of the imaging device 100 on the image display 28 (display 253) using images, voice, and the like. In Step S110, the system control circuit 50 sets the imaging device to Live View Display mode to display live images successively on the image display 28. The live view is provided in a so-called electric viewfinder (EVF).

In Step S111, color conversion mode specification is made in order to determine whether to run the color conversion mode in response to a user action and in order to specify color conversion data for input and output colors in the color conversion mode. For example, the system control circuit 50 brings up an operation screen (described later with reference to FIGS. 8A to 8C) in response to a user action, allowing the user to select whether to run the color conversion mode, and thereby determines whether to perform color conversion processing. When performing color conversion processing in the color conversion mode, an input color and output color are specified as the source color and destination color. The color conversion data is provided as a lookup table, and parameters such as an application range (described later) of the input color needed to generate the lookup table is also generated. Based on the input color and parameters, a lookup table to be used by the color converter 35 is generated by the LUT generator 36. Details of this processing will be described with reference to a flowchart in FIG. 5. In Step S112, the system control circuit 50 stores the color conversion data (lookup table for color conversion, etc.) specified in Step S111 in its internal memory or the memory 52. In Step S113, the images thus picked up and subjected to color conversion processing by means of the lookup table are displayed as live view.

In Step S201, the system control circuit 50 determines whether the shutter switch SW1 is on (whether the shutter button 251 is half-pressed). It returns to Step S103 if the shutter switch SW1 is not on, or goes to Step S202 if the shutter switch SW1 is on. In Step S202, the system control circuit 50 focuses the imaging lens 10 on a subject by focusing processing and determines aperture value and shutter speed by metering processing. In the metering processing, flash settings are made if necessary. After the processing in Step S202, the system control circuit 50 puts the image display 28 in live view display mode in Step S203. In the live view display mode, live images subjected to color conversion processing by means of the specified lookup table are displayed as in the case of Step S113.

The system control circuit 50 waits for the shutter button 251 to be pushed further down turning on the shutter switch SW2. It returns to Step S103 if the shutter switch SW1 is turned off during the wait. That is, if the shutter switch SW1 is released (turned off) without turning on the shutter switch SW2, the system control circuit 50 returns to Step S103 through Step S204 and Step S205. On the other hand, if the shutter switch SW2 is turned on, the system control circuit 50 goes from Step S204 to Step S206.

In Step S206, the system control circuit 50 puts the image display 28 in fixed-color display mode. In the fixed-color display mode, a single black image (blackout) is displayed for a certain period to let the user know through perception that an image was picked up with a press of the shutter button of the digital camera. In the fixed-color display mode, image data of the fixed color is displayed instead of photographic image data written into the image display memory 24 via the imaging element 12, A/D converter 16, image processing circuit 20, and memory control circuit 22. That is, the image data of the fixed color is displayed on the image display 28 via the memory control circuit 22 and D/A converter 26. Thus, the video image of the fixed color is displayed in the electric viewfinder, i.e., the image display 28.

In Step S207, the system control circuit 50 performs shooting processing including the exposure processing and developing processing (details of shooting processing will be described later with reference to FIG. 6). In the exposure processing, photographic image data is written into the memory 30 via the imaging element 12, A/D converter 16, image processing circuit 20, and memory control circuit 22 or directly from the A/D converter via the memory control circuit 22. In the developing processing, image data is read out of the memory 30 and subjected to various processes using the memory control circuit 22 and using the image processing circuit 20 as required. Details of the shooting processing in Step S207 will be described later with reference to FIG. 5.

In Step S208, the system control circuit 50 determines whether color conversion mode is set in its internal memory or the memory 52. If color conversion mode is set (has been set in Step S111 and Step S112), the system control circuit 50 goes to Step S209, where it makes the color converter 35 perform color conversion. After that, the system control circuit 50 goes to Step S210. In performing color conversion processing (311), the color converter 35 refers to a lookup table (three-dimensional lookup table) generated by the LUT generator 36 and stored in the memory 30. If it is determined that color conversion mode is not set, the system control circuit 50 goes from Step S208 to Step S210 by skipping Step S209. The system control circuit 50 makes image display settings on the image display 28 in Step S210 and displays a photographic image for quick review in Step S211. After the quick review display in Step S211, the system control circuit 50 generates file header information in Step S212, which takes shooting conditions into consideration.

Figure 9:
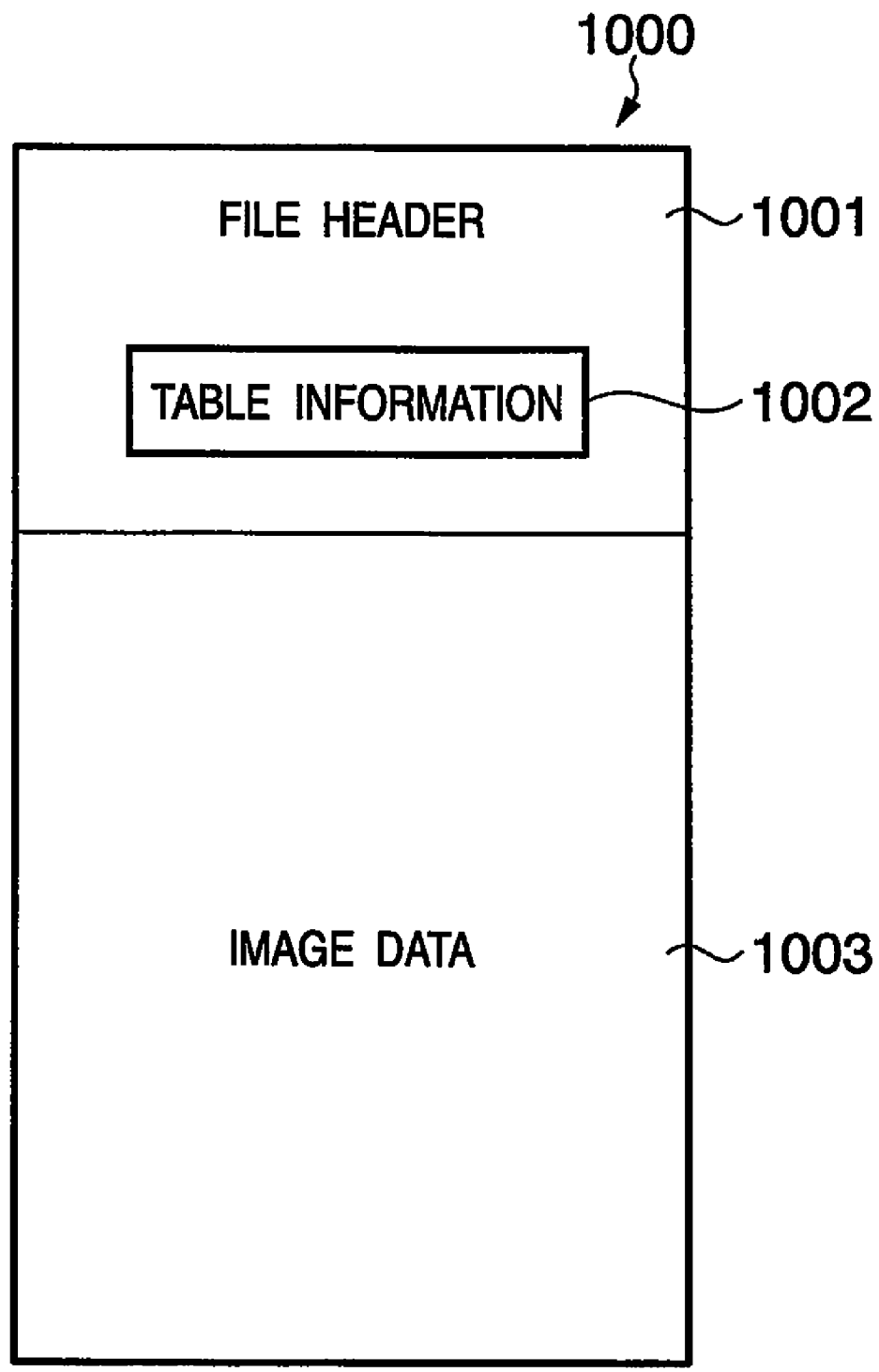
FIG. 9 is a block diagram showing a configuration example of an image file according to the embodiment of FIG. 1.

In Step S213, the system control circuit 50 determines a status of color conversion mode stored in its internal memory or the memory 52 (as in Step S208). If color conversion mode has been specified, the system control circuit 50 goes to Step S214, where it records information (referred to as color conversion information) needed to create the lookup table used for the color conversion in Step S209, in the file header of the image file generated in the memory 30. According to this embodiment, the color conversion information is recorded as table information 1002 as shown in FIG. 9. The table information includes, for example, the input color, output color, application range of the input color, and application range of the output color specified in Step S111. Incidentally, according to this embodiment, the application range of input color can be specified during a shooting operation, but the application range of output color corresponds to a range of output color characteristics specified for an individual imaging device. The application range of output color has been stored in the non-volatile memory 56 at the factory and is loaded in the memory 30 with reference to the non-volatile memory 56. On the other hand, if it is determined in Step S213 that color conversion mode has not been specified, the system control circuit 50 goes from Step S213 to Step S215 by skipping Step S214.

FIG. 9 is a block diagram showing a configuration example of an image file stored in the recording medium 200 or 210. An image file 1000 consists of a file header section 1001 and image data section 1003. As shown in FIG. 9, the table information 1002 is stored in the memory 30, being embedded in the file header section 1001.

In Step S215, the system control circuit 50 performs recording processing using the memory control circuit 22: reads photographic image data out of the memory 30 and writes the image data into the recording medium 200 or 210. In so doing, the system control circuit 50 performs various image processing using the image processing circuit 20 and color conversion processing using the color converter 35, as required. Also, the system control circuit 50 may perform image compression/decompression processing according to specified mode using the compression/decompression circuit 32. Details of the recording processing in Step S215 will be described later with reference to FIG. 7.

In this way, according to this embodiment, since the information needed to create the lookup table used for color conversion in the operation of color conversion mode is embedded as table information in the file header, the lookup table used for color conversion is saved. If color conversion is not performed, no table information is recorded, reducing the size of the generated file.

When the above recording processing (Step S215) is finished, if the shutter switch SW2 remains pressed, the system control circuit 50 goes from Step S216 to Step S217. In Step S217, the system control circuit 50 determines whether a continuous shooting flag is set in its internal memory or the memory 52. Incidentally, the continuous shooting flag is set when continuous shooting mode is set by a predetermined operation. If a continuous shooting flag is set, the system control circuit 50 returns to Step S207 to take continuous shots and starts taking the next shot. On the other hand, if a continuous shooting flag is not set, the system control circuit 50 returns to Step S216, where it repeats the current processing (S216 and S217) until the shutter switch SW2 is turned off.

In this way, according to this embodiment, if quick review display is set to be provided right after shooting, the quick review display continues as long as the shutter switch SW2 remains pressed. That is, after the recording processing in Step S215, the quick review display on the image display 28 continues until the shutter switch SW2 ceases to be pressed. This makes it possible to check a photographic image carefully.

After the recording processing in Step S215, if the shutter switch SW2 ceases to be pressed, the system control circuit 50 goes from Step S216 to Step S218. In Step S218, the system control circuit 50 waits until a predetermined minimum review time elapses. After the minimum review time elapses, the system control circuit 50 goes to Step S219, where it puts the image display 28 in live view display mode and goes to Step S220. To enter live view display mode in which live images are displayed successively for a next shot, the shutter button 251 can be returned to a half-pressed state or returned completely after checking the photographic image via quick review display on the image display 28. If the shutter button 251 is kept half-pressed (the shutter switch SW1 is kept on), the system control circuit 50 returns to Step S203 to prepare for a next shot. On the other hand, if the shutter button 251 is returned completely (the shutter switch SW1 is turned off), the system control circuit 50 returns from Step S220 to Step S103.

Now, details of the color conversion mode specification processing in Step S111 will be described with reference to FIG. 2, FIG. 5, and FIGS. 8A to 8C.

Figure 8A:
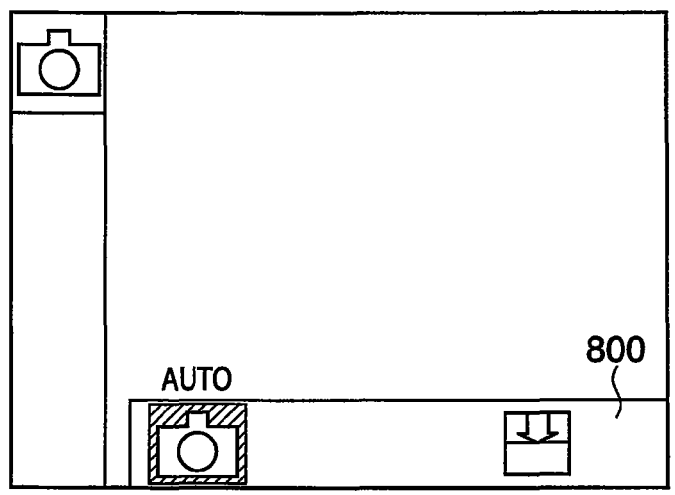
FIGS. 8A to 8C are diagrams showing configuration examples of a user interface used to generate lookup tables.
Figure 8B:
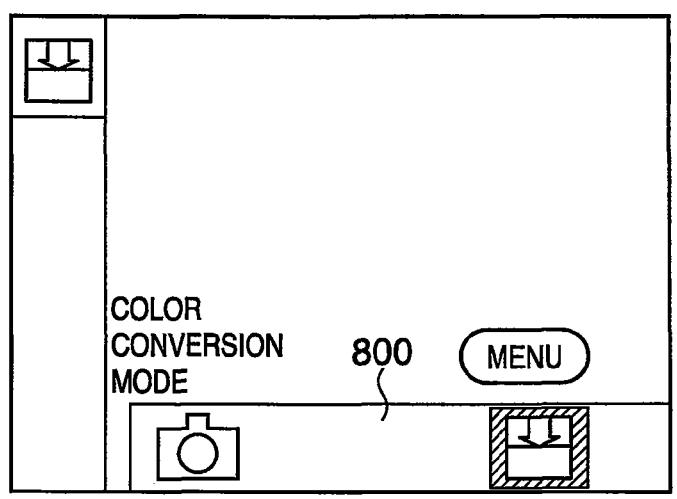
Figure 8C:
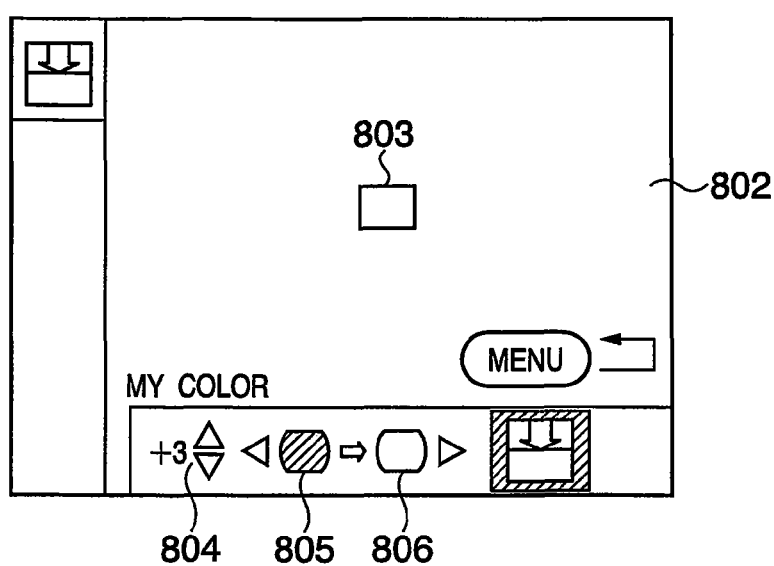

If a FUNC button 254 is pressed during live view display in Step S110, a function menu 800 appears on the image display 28 as shown in FIG. 8A. By pressing the LEFT button 904 or RIGHT button 902 in this state, it is possible to select Auto mode in which color conversion processing is not performed or Color Conversion mode in which color conversion processing is performed (FIGS. 8A and 8B). The mode set here is stored in the internal memory or the memory 52 in Step S112 and referred to in Steps S208, S213, etc.

Figure 7:
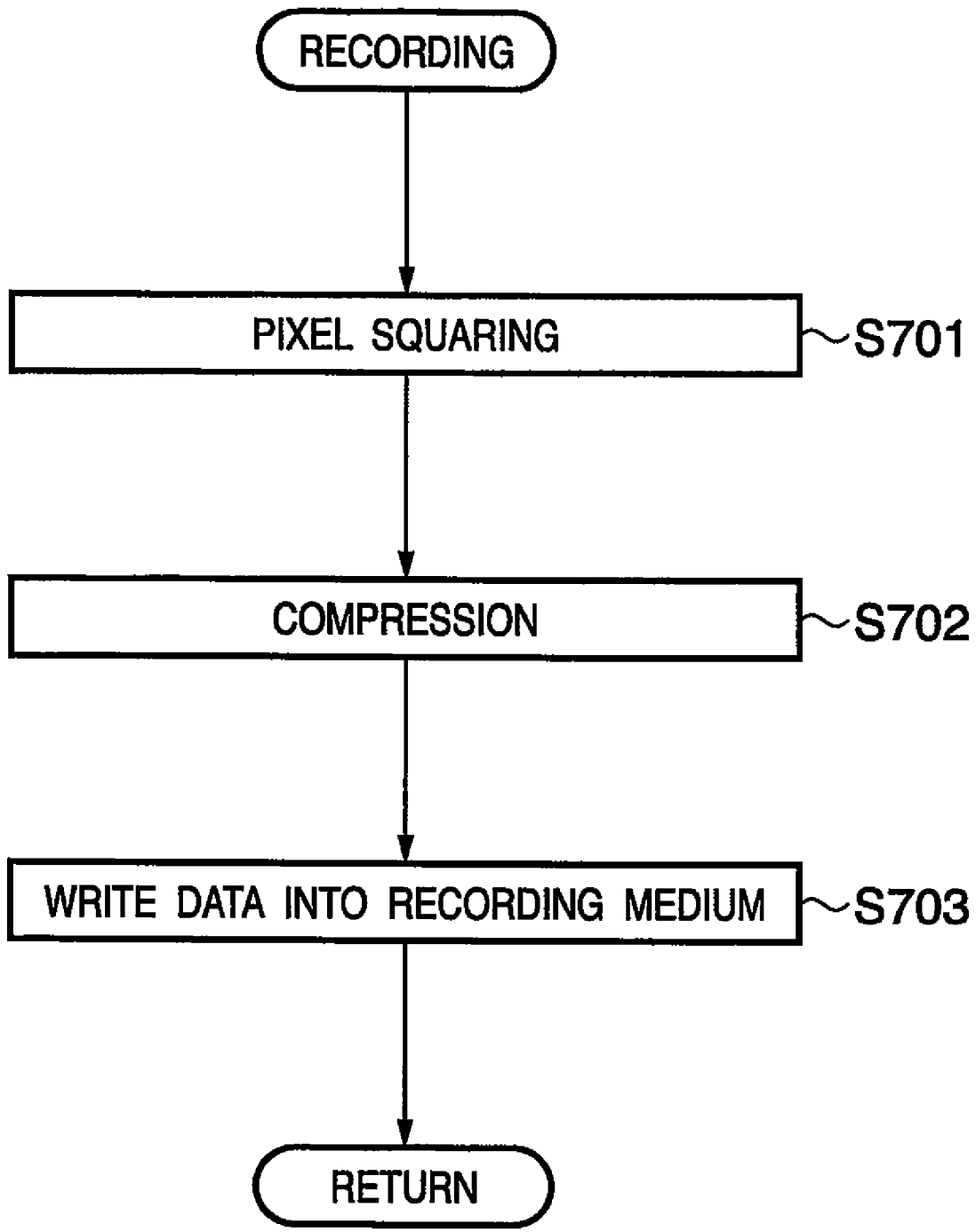
FIG. 7 is a flowchart showing details of recording processing according to the embodiment of FIG. 1.

When the MENU button 255 is pressed while the color conversion mode is selected as shown in the function menu 800 in FIG. 8B, a settings screen such as shown in FIG. 8C appears. A settings screen 802 for use to generate a color conversion lookup table appears on the image display 28 and the color conversion mode specification processing shown in FIG. 7 is started. The settings screen 802 displays a frame 803 for use to capture an input color or output color. It also displays a level value 804 which indicates the application range of the input color, a color sample 805 of the input color, and color sample 806 of the output color.

Figure 15:
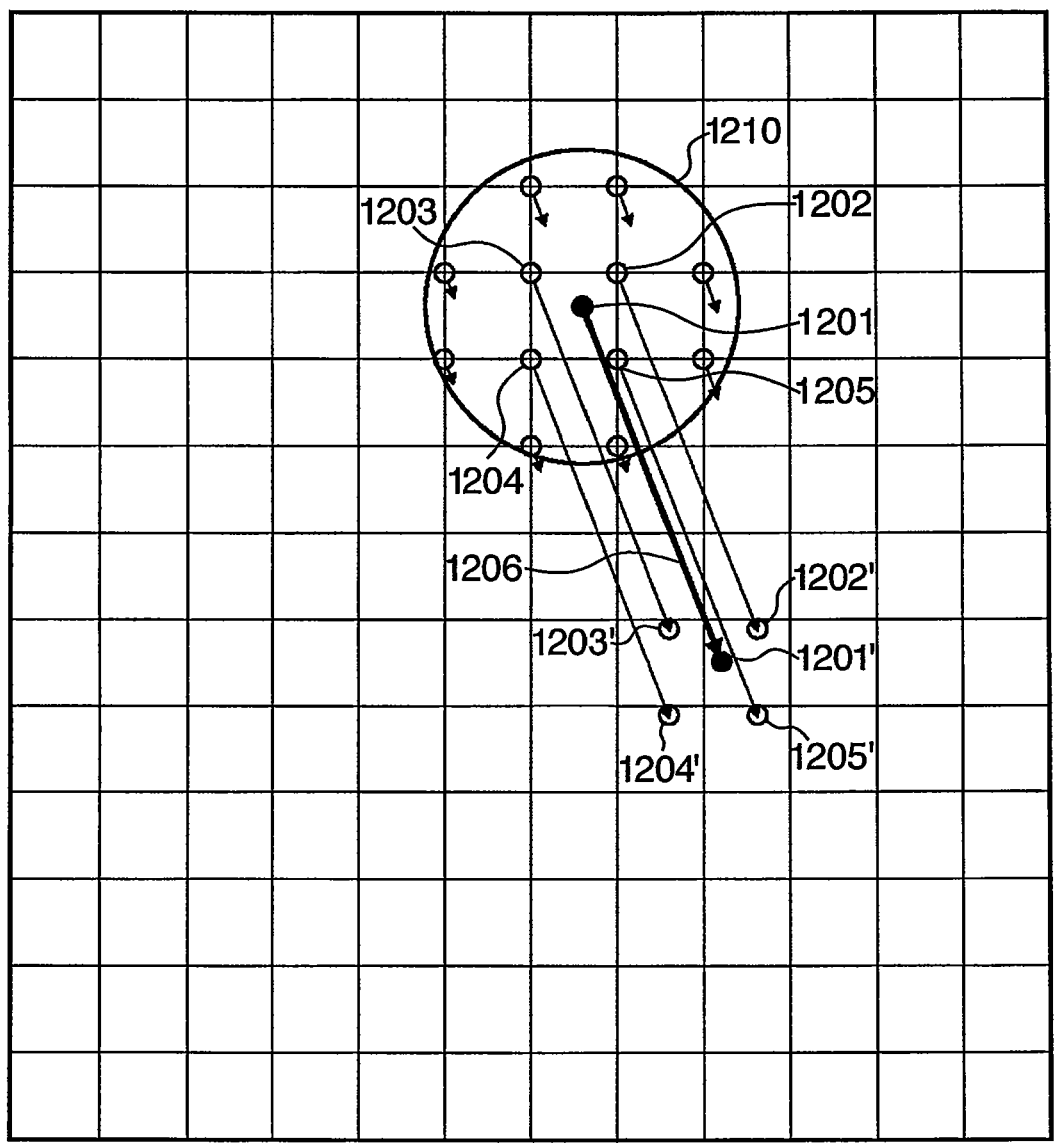
FIG. 15 is a diagram explaining an application range of source colors.

With the settings screen 802 displayed, the system control circuit 50 detects a button event (Step S501). If an UP button 901 input is detected, the system control circuit 50 goes from Step S502 to Step S504. If a DOWN button 903 input is detected, the system control circuit 50 goes from Step S503 to Step S504. In Step S504, the application range of the input color is adjusted and set by increasing and decreasing the currently set level value 804 (the application range of input color will be described later with reference to FIG. 15). The system control circuit 50 goes to Step S509, where a lookup table is generated by the LUT generator 36 based on the currently set input color, output color, application range of the input color, and application range of the output color. The application range of the output color indicates a level (degree) of the effect of color conversion in the input color range. Incidentally, as described above, it is assumed that the application range of output color has been stored in the non-volatile memory 56 at the factory. The specified application range is stored in the internal memory or the memory 52. The lookup table generated by the LUT generator 36 is transferred to the memory 30. The lookup table may be generated without taking into consideration the application range of output color. In that case, the output color obtained by the color converter 35 through color conversion processing by means of the lookup table is adjusted with reference to the "application range of output color" to correct characteristics of the individual imaging device. When the application range of output color is used separately, the color conversion data includes the lookup table and the application range of output color. That is, the color conversion data is data needed by the color converter 35 to perform color conversion processing.

On the other hand, the color conversion information (table information 1002) is information needed to reproduce the color conversion data later.

If a LEFT button 904 input is detected, the system control circuit 50 goes from Step S505 to Step S506. In Step S506, the color data in the capture frame 803 is captured as an input color from the image captured by the imaging element 14 and converted into a digital signal by the A/D converter 16. The average of color values of the pixels in the capture frame 803 is used as the input color. In Step S509, a lookup table (three-dimensional lookup table) is generated by the LUT generator 36 using the input color. The generated table is transferred to the memory 30.

If a RIGHT button 905 input is detected, the system control circuit 50 goes from Step S507 to Step S508. In Step S508, the color data in the capture frame 803 is captured as an output color from the image captured by the imaging element 14 and converted into a digital signal by the A/D converter 16. The average of color values of the pixels in the capture frame 803 is used as the output color. In Step S509, a lookup table is generated by the LUT generator 36 using the output color. The generated table is transferred to the memory 30.

Figure 5:
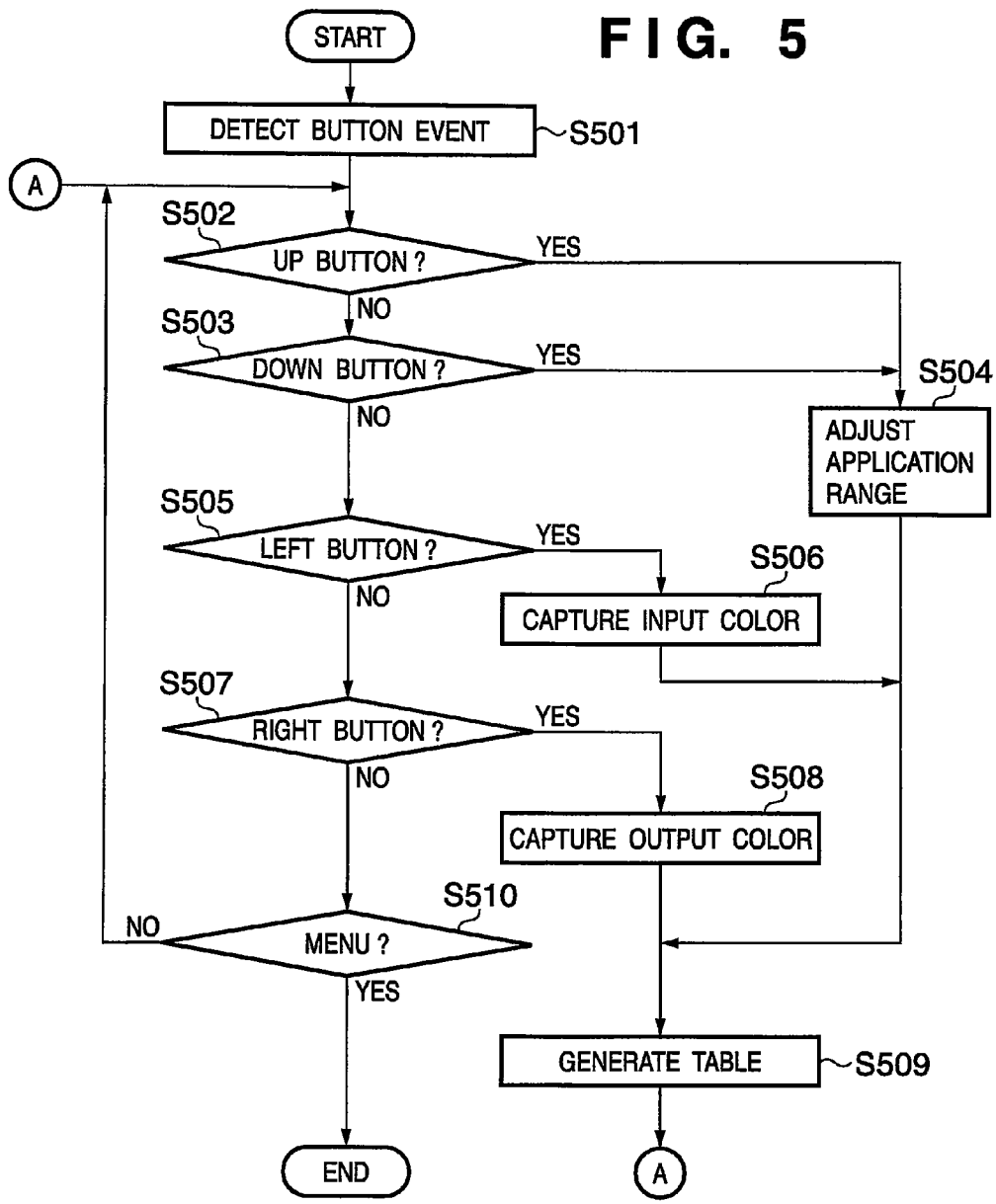
FIG. 5 is a flowchart showing details of color conversion mode specification processing according to the embodiment of FIG. 1.

If a MENU button 255 input is detected, the system control circuit 50 finishes the processing shown in FIG. 5, i.e., the color conversion mode specification processing. After that, the system control circuit 50 goes to Step S112, where it applies the current color conversion mode. That is, the color conversion data generated in Step S509 is made available to the color converter 35.

The above is details of the color conversion mode specification processing (Step S111). Next, the application range of input color will be described with reference to FIG. 15.

The application range of input color prescribes the range of input color affected by color conversion and is expressed in terms of level such as −1, 0, and +1. An example of application range adjustment will be described with reference to FIG. 15. Incidentally, a two-dimensional lookup table is used in FIG. 15 for ease of explanation.

Suppose, color value of a point 1201 is specified as a source color and color value of a point 1201' is specified as a target color. Vertices 1202 to 1204 of a lattice which connotes the point 1201 move with a vector 1206 which joins the point 1201 and point 1201', and thereby establish points 1202' to 1204'. The size of a circle 1210 is determined by a level value set as an application range. The circle 1210 with its size corresponding to the level value is drawn around the point 1201. In this state, as with the lattice points 1202 to 1204, the other lattice points in the circle 1210 move in the same direction as the vector 1206. However, their magnitudes (amounts of travel) vary among them. The magnitude of each lattice point vector is determined, for example, by multiplying the magnitude of the vector 1206 by a coefficient whose value is 1 at the center of the circle 1210, 0 on the circumference, and decreases with increasing distance from the center. For example, if the radius of the circle 1210 is r and the distance of a given lattice point in the circle 1210 from the lattice point 1201 is p, the movement vector of the given lattice point is determined by multiplying the vector 1206 by k=(r−p)/r. The radius r of the circle 1210 increases with increases in the level value, resulting in expansion of the application range of the source color. In other words, in the three-dimensional lookup table, the input color included in the radius r is treated as a group of the conversion source colors to be subjected to a conversioni processing. To apply the above processing to a three-dimensional lookup table as FIG. 9, the lattice may be replaced with a cubic lattice and the circle 1210 may be replaced with a sphere. The application range of the output color indicates a degree of the effect of a conversion target color depend on a distance from the center in the circle 1210 of radius r centered by the conversion source color in the application range of the input color. That is, as the value of the application range of the output color is larger, the lattice points included in the radius r are greatly affected by the effect of the conversion target color and subjected to color conversion. Also, it is shown that as the value is smaller, the lattice points near the center are affected by the effect of the conversion target color and as they are distant, a color conversion affected by the effect on the conversion target color becomes difficult to be done. In this way, the application range of the output color is set at a numeric level.

Next, details of the shooting processing (Step S207) will be described with reference to FIG. 6.

Figure 6:
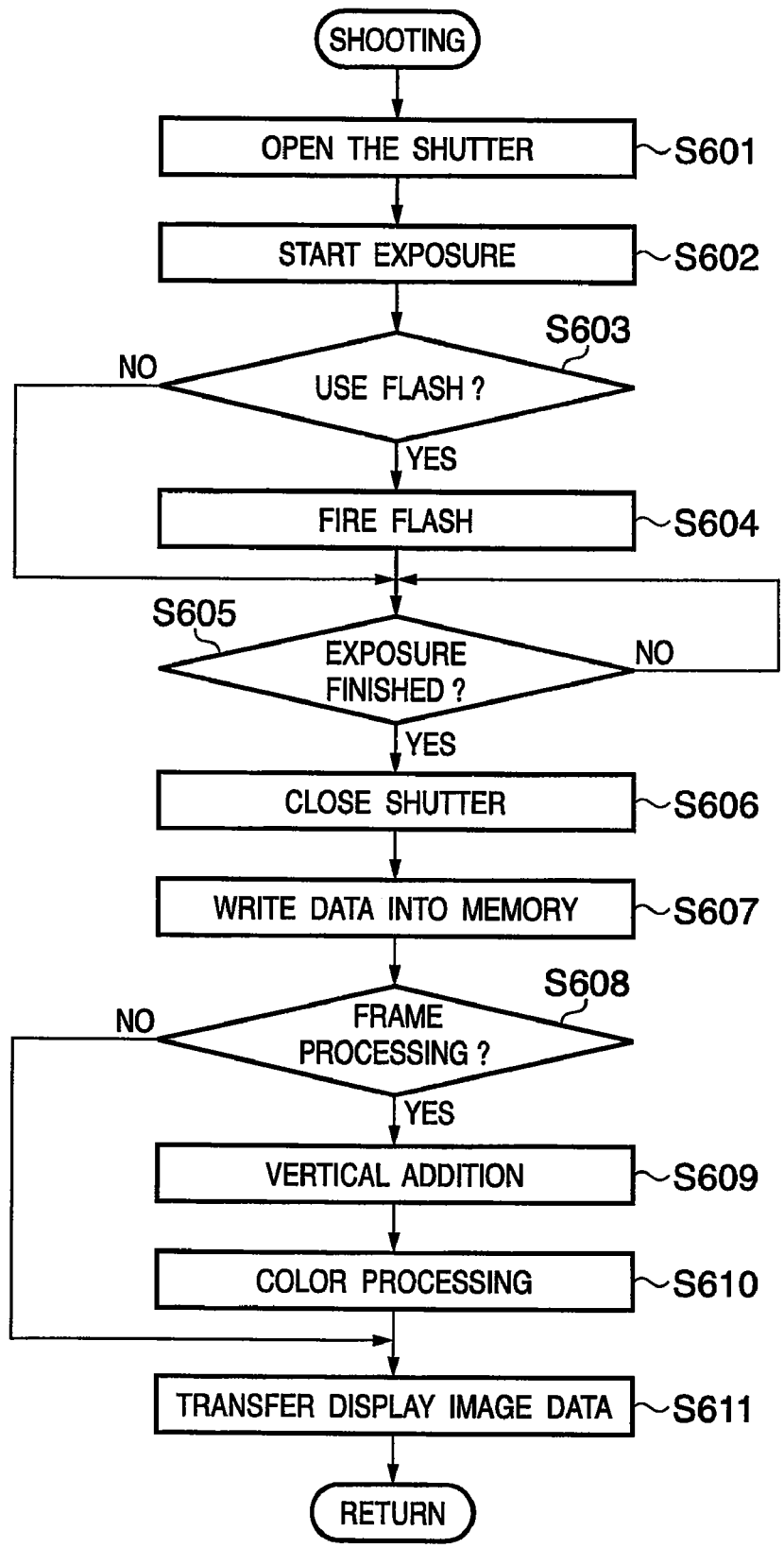
FIG. 6 is a flowchart showing details of shooting processing according to the embodiment of FIG. 1.

FIG. 6 is a flowchart showing details of the shooting processing performed in Step S207 in FIG. 3. The system control circuit 50 performs processes of Steps S601 to S606 based on the aperture value, shutter speed, and flash settings determined in Step S202. That is, in Steps S601 and S602, the exposure controller 40 starts exposure of the imaging element 14 by opening the shutter 12 equipped with an aperture adjustment function according to the aperture value. In Step S603, the system control circuit 50 determines whether it is necessary to use the flash 48, based on the flash settings made in Step S202. If it is necessary to use the flash 48, the system control circuit 50 goes to Step S604 to use the flash 48. If it is not necessary, the system control circuit 50 skips Step S604.

In Step S605, the system control circuit 50 waits for the exposure of the imaging element 14 to end, based on the shutter speed determined in Step S202. When it is time to end the exposure, the system control circuit 50 goes to Step S606 and closes the shutter 12. In Step S607, data of the photographic image is written into the memory 30. That is, a charge signal is read out of the imaging element 14 and written as the data of the photographic image into the memory 30 via the A/D converter 16, image processing circuit 20, and memory control circuit 22 or directly from the A/D converter 16 via the memory control circuit 22.

If the specified shooting mode requires frame processing, the system control circuit 50 goes from Step S608 to Step S609. The frame processing consists of interpolating missing pixels, by means of vertical addition, into a signal read out of the imaging element by field reading, performing white balance processing on the interpolated signal, and thereby creating one frame (one photographic image). The system control circuit 50 reads image data out of the memory 30 and performs vertical addition processing (Step S609) and color processing (Step S610) in sequence using the memory control circuit 22 and using the image processing circuit 20 as required. After that, it writes the processed image data into the memory 30. In Step S611, the system control circuit 50 reads the image data out of the memory 30 and transfers it for display to the image display memory 24 via the memory control circuit 22. This ends the shooting processing in Step S207.

It has been stated that the shutter speed, aperture value, and flash settings are determined in Step S202. Alternatively, all that is done in Step S202 may be to store metering data in the internal memory of the system control circuit 50 or in the memory 52. In that case, for example, before the start of exposure in Step S601, the shutter speed, aperture value, and flash settings are calculated using the stored metering data.

Next, the recording processing in Step S215 will be described in detail. FIG. 7 is a flowchart showing details of the recording processing in Step S215.

First, pixel squaring processing is performed in Step S701. Using the memory control circuit 22 and using the image processing circuit 20 as required, the system control circuit 50 reads photographic image data out of the memory 30 and interpolates the image data so that a pixel aspect ratio will be 1:1. The image data subjected to the pixel squaring processing is stored in the memory 30. Next, in Step S702, the image data written into the memory 30 in Step S701 is read out and subjected to image compression processing by the compression/decompression circuit 32 according to the specified mode. The compressed image data is written into the memory 30.

In Step S703, the system control circuit 50 writes the file header section 1001 generated in Steps S212 and S214 and compressed image data 1003 from the memory 30 into the recording medium 200 or 210. That is the file header section 1001 and image data 1003 in the memory 30 are written into the recording medium 200 or 210 such as a memory card or Compact Flash (registered trademark) card via the interface 90 or 94 and the connector 92 or 96. In this way the image file configured as shown in 1000 in FIG. 9 is recorded on the recording medium 200 or 210. After the writing into the recording medium 200 or 210 is finished, the recording processing routine terminates.

As described above, the table information 1002 is recorded in the file header section 1001, making it possible to reproduce the lookup table used in the color conversion processing. That is, the lookup table is reproduced, for example, by the device which reads the image file, based on the input color, output color, application range of the input color, and application range of the output color. Consequently, the lookup table generated during shooting is stored. Incidentally, the table information may contain only the input color and output color if the application range of the input color is fixed. On the other hand, if the application range of the output color is fixed, the table information may contain only the input color, output color, and application range of the input color.

Incidentally, although conditions for generating the table—namely, the input color, output color, application range of the input color, and application range of the output color—are recorded as color conversion information in the above embodiment, this is not restrictive. For example, the lookup table itself (e.g., values of all the lattice points in FIG. 14) generated in Step S509 may be stored as the table information 1002. Alternatively, the color conversion information may contain the application range of the input color and/or application range of the output color in addition to the lookup table. This eliminates the need for the device which reads the image file to reconstruct the lookup table. However, this increases the file size. Again, the size of the generated file can be reduced by not recording the table information when no color conversion is performed. On the other hand, such a lookup table which skips color conversion if the color conversion mode is not selected may be embedded (recorded) in the file header. This allows the size of the file header generated by the imaging device 100 to be kept constant. Furthermore, instead of recording all the lattice points of the lookup table, only the lattice points whose input values and output values are different may be retained.

The lookup table used in the color conversion processing above is only an example. Needless to say a lookup table of another form may be used, such as a lookup table whose output values have a one-to-one relationship with the input values which does not require interpolation processing. Although the lookup table described above is configured to input a YUV signal and output a Y'U'V' signal resulting from conversion, it is alternatively possible, for example, to input an RGB signal and output a Y'U'V' signal resulting from conversion. Also, although the color conversion processor uses a three-dimensional lookup table as color conversion data, this is not restrictive. For example, the color conversion processor may have arithmetic expressions and matrices, carry out computations by assigning a coefficient group of the arithmetic expressions and matrices in each conversion processing, and thereby perform color conversion. In that case, the coefficient group will be stored in the header of an image as color conversion information.

Also, although color conversion information including color conversion data is embedded and stored in the header of an image file, an image and its color conversion information may be stored in different files if they are linked or otherwise associated with each other so that they can be identified. However, if color conversion information is embedded in the header of an image file, it can be managed more easily than when it is stored in a different associated file.

As described above, according to the above embodiment, information for use to generate color conversion data (e.g., a lookup table) used during shooting of a photographic image or color conversion data itself (e.g., a lookup table) is embedded in the same file as the photographic image. This makes it easy to associat the photographic image with the lookup table. Also, the lookup table can be acquired and checked easily on an external device which reads out the image file. For example, the user can refer to the lookup table used for the photographic image, during preview of the photographic image. Also, when an image file is transferred to another device such as a personal computer, the lookup table can be extracted from the image file. This makes it possible to manage the lookup table among different devices or apply the extracted lookup table to processing of another image.

The imaging device according to this embodiment sets a source color and destination color (i.e., captures the colors) and performs color conversion processing of a photographic image based on the source color and destination color. It is obvious that such color conversion processing can also be applied to retouch processing of images performed by application software on information processing units (e.g., personal computers). For example, a lookup table such as the one described above is generated when a source color or destination color is specified during retouching of a photographic image inputted in a personal computer or the like via a recording medium or communications means (not shown) and displayed on a monitor. In such a case, various methods are available to specify the source color or destination color.

Second Embodiment

The first embodiment has been described above, taking recording of a still image file (still-image recording mode) as an example. In a second embodiment below, recording of a moving image file will be described. That is, the imaging device 100 according to the second embodiment has still-image shooting mode and moving-image shooting mode, either of which can be selected with the mode dial switch 60. The configuration of the imaging device and recording of still image files in still-image shooting mode are the same as the first embodiment. Now, description will be given below of recording onto a recording medium after shooting in moving-image shooting mode.

Figure 16:
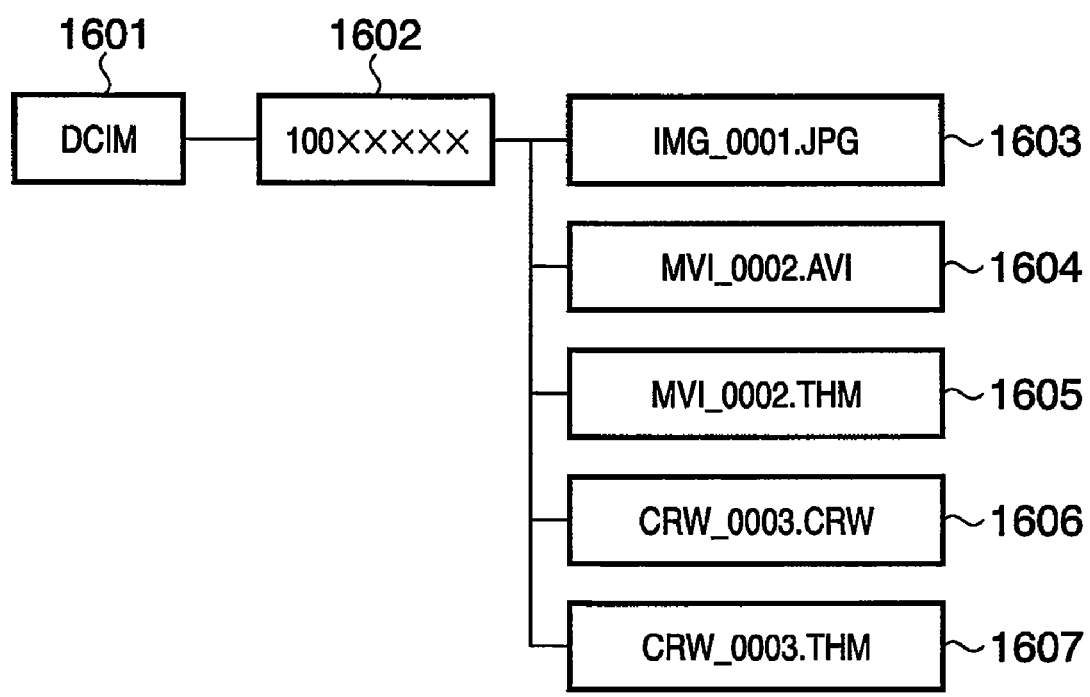
FIG. 16 is a diagram illustrating a directory structure for use to store image files according to the embodiment of FIG. 1.

FIG. 16 is a diagram showing an example of how image files are stored on the imaging device 100. When a still image file or moving image file is created as a result of shooting, a DCIM directory 1601 is created in the root directory. A subdirectory (100XXXXX) 1602 is created in the DCIM directory 1601 to store image files, and a still image file (IMG_0001.JPG) 1603 is created in the subdirectory 1602.

When moving image files are created, moving image files with file numbers (the last four digits of the file names, in this example) which vary from shot to shot as well as thumbnail files containing image file associated information and thumbnails are created in the directory. FIG. 16 shows a moving image file (MVI_0002.AVI) 1604 and a thumbnail file (MVI_0002.THM) 1605 as an example. In the case of shooting in raw data recording mode which will be described in a third embodiment, raw files with different file numbers as well as thumbnail files containing file associated information and thumbnails are created in the directory. FIG. 16 shows a raw file (CRW_0003.CRW) 1606 and thumbnail file (CRW_0003.THM) 1607.

Figure 17:
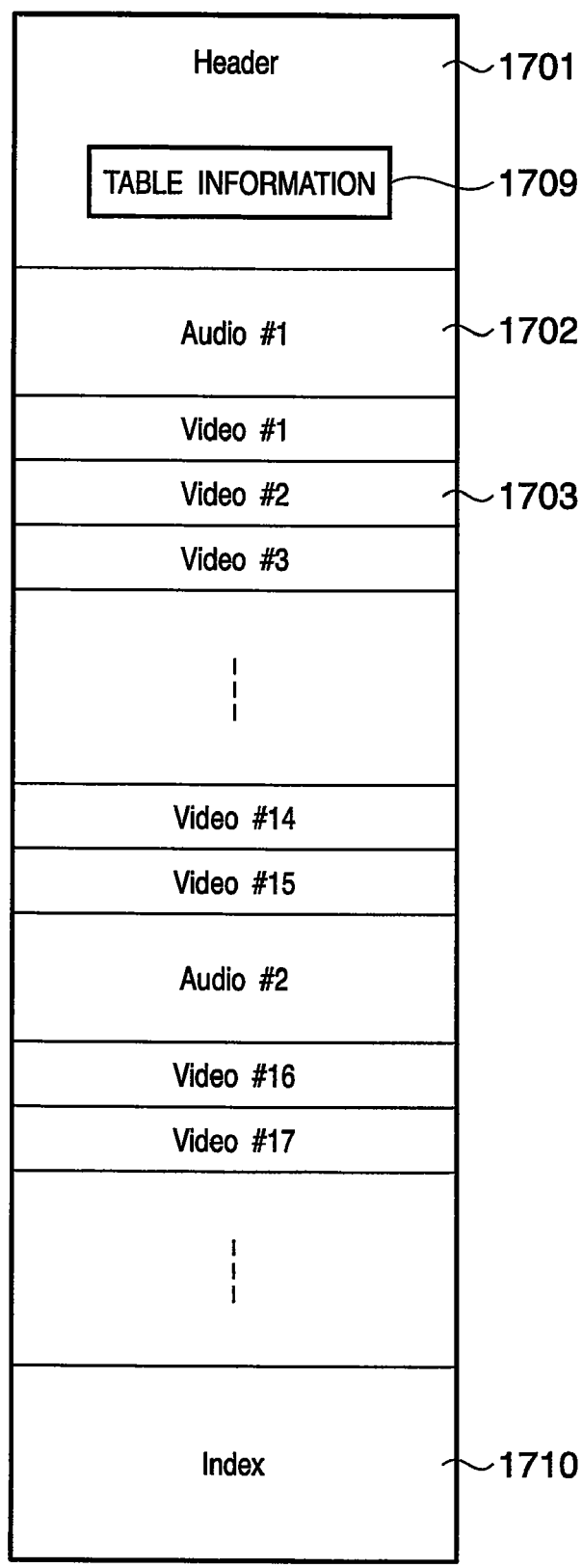
FIG. 17 is a diagram showing a configuration example of a moving image file according to a second embodiment.

A structure of the moving image file 1604 is shown in FIG. 17. A header section 1701 is recorded at the head of the file, and an audio section 1702 and a video section 1703 corresponding to the film rate of recording are recorded in succession. Also, an index section 1710 for use to store offset information for various data is recorded at the end of the moving image file.

During recording of moving images, if the color conversion processing (color conversion processing of moving images, in this case) described in the first embodiment is performed, table information 1709 used for the color conversion is recorded in the header section 1701. The table information 1709 is the same as the table information 1002 (FIG. 9) according to the first embodiment.

The thumbnail file 1605 which contains the associated information about the moving image file 1604 has the same structure as the still image data format shown in FIG. 9. That is, as in the case of the first embodiment, the table information 1002 used for color conversion can be recorded in the file header section 1001. Incidentally, according to this embodiment, the moving image file 1604 and thumbnail file 1605 have the same name except for the extension. That is, the moving image file and thumbnail file are associated with each other.

As described above, the second embodiment makes it possible to acquire, together with moving image data subjected to color conversion processing, color conversion information which allows the color conversion processing (e.g., a lookup table) to be reproduced.

Third Embodiment

In the first embodiment, description has been given of an example of how image data subjected to developing processing is recorded in still-image recording mode. According to a third embodiment, still-image recording mode has developed-image recording mode in which image data subjected to developing processing is recorded and raw data recording mode in which data (raw data) just read out of an imaging device is recorded. Incidentally, a configuration of the image file recorded in the developed-image recording mode is the same as in the first embodiment (FIG. 9). On the other hand, a configuration of the image file recorded in the raw data recording mode has a configuration shown in FIG. 18.

In the developed-image recording mode, the imaging device according to this embodiment records the still image file (IMG_0001.JPG) 1603 containing the image data subjected to developing processing including color conversion processing. In the raw data recording mode, it records the raw file (CRW_0003.CRW) 1606 and thumbnail file (CRW_0003.THM) 1607 containing associated information and thumbnails, as described above.

Figure 18:
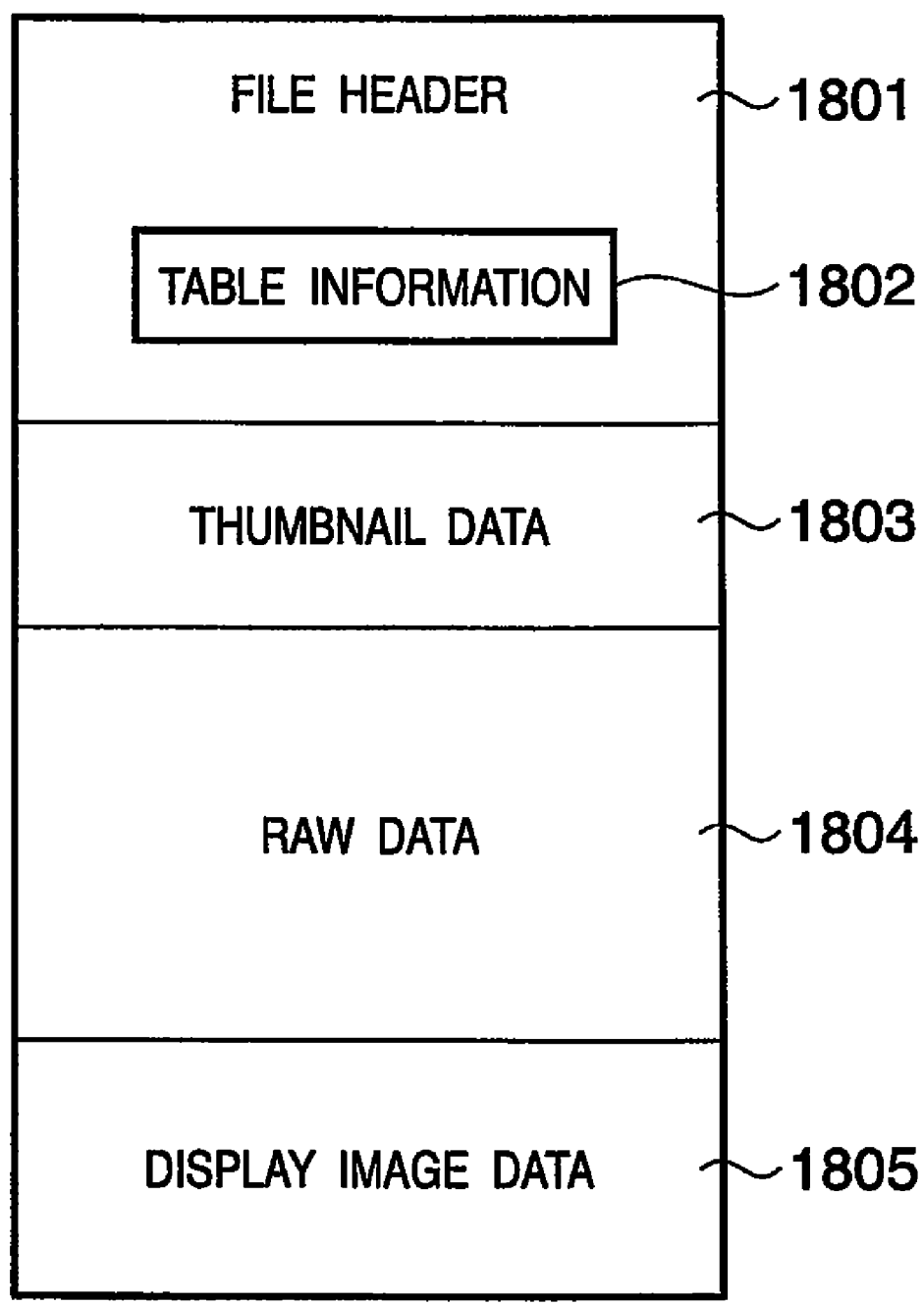
FIG. 18 is a diagram showing a configuration example of a raw file according to a third embodiment.

File format of the raw file 1606 in which raw data is recorded is shown in FIG. 18. The raw file 1606 has a file header section 1801, thumbnail data section 1803 used to store thumbnails, raw data section 1804 used to store raw data, and display image data section 1805 used to store display image data.

During shooting in raw data recording mode, if the color conversion processing described in the first embodiment is specified, the data read out of the imaging element 14 is recorded in the raw data section 1804. Also, the data read out of the imaging element 14 is subjected to developing processing including the color conversion processing, and subjected to reducing processing as appropriate, thereby generating thumbnail data and display image data. The generated thumbnail data and display image data are recorded as the thumbnail data section 1803 and display image data section 1805, respectively. Besides, table information 1802 used for the color conversion is recorded in the file header section 1801. The table information 1802 is the same as the table information 1002 (FIG. 9) according to the first embodiment.

The thumbnail file generated at the same time has a file format shown in FIG. 9. Also, it has a color conversion table in the file header section as in the case of the second embodiment. According to this embodiment, the raw file 1606 and thumbnail file 1607 have the same name except for the extension. That is, the raw file and thumbnail file are associated with each other. Since the RAW file 1606 holds the thumbnail data portion 1803, it is unnecessary to create a thumbnail file 1607 separately. In addition, if a thumbnail file 1607 is created separately, it can be used instead of a preview image of the RAW file 1606 to see the effect of a simple image processing, for example.

As described above, the third embodiment makes it possible to acquire information about color conversion specified during shooting, together with raw data. It also makes it possible to check results of the color conversion processing by means of thumbnail images.

Incidentally, in the second and third embodiments, the table information may be recorded in one of the files. For example, in the second embodiment, the table information may be recorded in either the moving image file 1604 or thumbnail file 1605, and in the third embodiment, the table information may be recorded in either the raw file 1606 or thumbnail file 1607.

Other Embodiment

The various means of the imaging device and various steps of the imaging method according to embodiments of the present invention are implemented when a program stored in a RAM or ROM of a computer is executed. The program and a computer-readable storage medium containing the program are also included in the present invention.

Also, the present invention can also be embodied as a system, apparatus, method, program, or recording medium. Specifically, it may be applied to a system composed of two or more devices as well as to apparatus composed of a single device.

Incidentally, the present invention also includes a configuration in which a software program which implements the embodiments described above (program corresponding to the flowchart in FIG. 3) is supplied to a system or apparatus either directly or remotely and a computer in the system or apparatus reads out and executes the supplied program code.

Thus, the program code itself installed on the computer to implement functions and processes of the present invention on the computer also implements the present invention. That is, the present invention also includes the computer program which implements the functions and processes of the present invention.

In that case, the program code may take any form including object code, programs executed by an interpreter, and script data supplied to an OS as long as it has program functions. For example, an output-ready file may be generated by transferring a photographic image to a personal computer, allowing the user to specify a source color and destination color on an application program, performing color conversion on image data using color conversion data generated based on the specified colors, and associating the image data with color conversion information including the color conversion data.

Recording media available for use to supply programs include, for example, floppy (registered trademark) disks, hard disks, optical disks, magneto-optical disks, MO, CD-ROM, CD-R, CD-RW, magnetic tape, non-volatile memory cards, ROM, DVD (DVD-ROM and DVD-R), etc.

The program can also be supplied by allowing the user to connect to an Internet homepage using a browser on a client computer and download the computer program itself of the present invention or a compressed self-installing file from the homepage onto a recording medium such as a hard disk.

Also, the program code of the program according to the present invention may be divided into multiple files, which can be downloaded from respective homepages. That is, the present invention also includes WWW servers which allow multiple users to download program files capable of implementing the functions and processes of the present invention on a computer.

The present invention can also be implemented by supplying users with a storage medium such as a CD-ROM containing the program of the present invention in encrypted form, providing key information for decryption to the user who satisfies predetermined conditions through a download from an Internet homepage, and allowing the user to decrypt and install the program on a computer using the key information.

The functions of the above embodiments may be implemented not only by the program read out and executed by the computer, but also by part or all of the actual processing executed, in accordance with instructions from the program, by an OS running on the computer.

Furthermore, the functions of the above embodiments may also be implemented by writing the program thus acquired into memory in an imaging device via a recording medium or via connection with the computer, and executing part or all of the actual processing in accordance with instructions from the program.

The present invention makes it possible to export color conversion data prepared for image data created by imaging. For example, image data obtained by imaging and color conversion data applied to it can be acquired by an external apparatus.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-043144, filed on Feb. 18, 2005, and Japanese Patent Application No. 2006-034318, filed on Feb. 10, 2006, which are hereby incorporated by reference herein in their entirety.

What is claimed is:

1. An image recording apparatus comprising:
    a generating unit configured to generate a lookup table which defines a relationship between input color and output color on one color coordinate based on a source color, a destination color, and an application range which represents a continuous color range on the one color coordinate and is determined in accordance with the position of the source color on the one color coordinate, wherein colors in the application color range are subjects to be converted;
    a developing unit configured to develop raw image data acquired by an imaging unit;
    a color conversion unit configured to perform color conversion processing, using the lookup table, on the developed image data developed by said developing unit;
    a processing unit configured to generate thumbnail image data on the basis of the developed image data converted by said color conversion unit;
    an output unit configured to output a raw image data file containing the raw image data, the thumbnail image data generated by said processing unit, and color conversion information which includes the source color, the destination color, and the application range used to make the lookup table generated by said generating unit reproducible, while associating the color conversion information with the thumbnail image data;
    a mode setting unit configured to allow a user to set color conversion mode in which color conversion processing is performed by said color conversion unit; and
    a control unit configured to make said output unit generate the raw image data file containing color conversion information which specifies color conversion data whose input values are used directly as output values, if the color conversion mode is not set.

2. The image recording apparatus according to claim 1, further comprising:
    a display unit configured to display, in real time, the image data acquired by said imaging unit; and
    a determination unit configured to determine the source color and the destination color based on pixel values specified on an image displayed by said display unit.

3. The image recording apparatus according to claim 1, wherein the color conversion information includes a level to which color conversion is applied.

4. An image recording method comprising:
    using a processor to perform:
    a generating step of generating a lookup table which defines a relationship between input color and output color on one color coordinate based on a source color, a destination color, and an application range which represents a continuous color range on the one color coordinate and is determined in accordance with the position of the source color on the one color coordinate, wherein colors in the application color range are subjects to be converted;
    a developing step of developing raw image data acquired by an imaging unit;
    a color conversion step of performing color conversion processing, using the lookup table, on the developed image data developed in said developing step;
    a processing step of generating thumbnail image data on the basis of the developed image data converted in said color conversion step;

an output step of outputting a raw image data file containing the raw image data, the thumbnail image data generated in said processing step and color conversion information which includes the source color, the destination color, and the application range used to make the lookup table generated in the generating step reproducible, associating the color conversion information with the thumbnail image data;

a mode setting step of allowing a user to set color conversion mode in which color conversion processing is performed in said color conversion step; and a control step of making said output step generate the raw image data file containing color conversion information which specifies color conversion data whose input values are used directly as output values, if the color conversion mode is not set.

5. A non-transitory computer-readable medium storing, in executable form, a control program for making a computer execute the image recording method according to claim 4.

* * * * *